(12) United States Patent
Kim et al.

(10) Patent No.: US 11,722,032 B2
(45) Date of Patent: Aug. 8, 2023

(54) ELECTRIC MOTOR ASSEMBLY

(71) Applicant: LG Electronics Inc., Seoul (KR)

(72) Inventors: Jaeho Kim, Seoul (KR); Sunghyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/512,132

(22) Filed: Oct. 27, 2021

(65) Prior Publication Data

US 2022/0209620 A1 Jun. 30, 2022

(30) Foreign Application Priority Data

Dec. 30, 2020 (KR) .................... 10-2020-0187834

(51) Int. Cl.
| | |
|---|---|
| *H02K 5/20* | (2006.01) |
| *H02K 5/173* | (2006.01) |
| *H02K 7/08* | (2006.01) |
| *H02K 9/06* | (2006.01) |
| *H02K 21/14* | (2006.01) |

(52) U.S. Cl.
CPC ........... *H02K 5/207* (2021.01); *H02K 5/1735* (2013.01); *H02K 7/085* (2013.01); *H02K 9/06* (2013.01); *H02K 21/14* (2013.01)

(58) Field of Classification Search
CPC ........ H02K 5/1732; H02K 11/33; H02K 5/22; H02K 9/06
USPC .............................. 310/60 R, 62–63, 50, 89
See application file for complete search history.

(56) References Cited

U.S. PATENT DOCUMENTS

| | | | | |
|---|---|---|---|---|
| 2,968,249 | A | * | 1/1961 | Caine .................. F04D 3/00 310/63 |
| 2009/0142204 | A1 | | 6/2009 | Yamamoto et al. |
| 2015/0207378 | A1 | | 7/2015 | Büttner et al. |
| 2017/0170709 | A1 | | 6/2017 | Barnes et al. |
| 2019/0101129 | A1 | | 4/2019 | Teramoto et al. |

(Continued)

FOREIGN PATENT DOCUMENTS

| | | |
|---|---|---|
| CN | 107925304 | 4/2018 |
| CN | 106340979 | 1/2019 |
| EP | 3155947 | 4/2017 |

(Continued)

OTHER PUBLICATIONS

Extended European Search Report in European Appln. No. 21207035.3, dated May 10, 2022, 12 pages.

(Continued)

*Primary Examiner* — Jose A Gonzalez Quinones
(74) *Attorney, Agent, or Firm* — Fish & Richardson P.C.

(57) ABSTRACT

An electric motor assembly includes an outer housing with two sides open, an impeller provided in the outer housing, an inner housing disposed concentrically in the outer housing and spaced apart from the impeller, a stator provided in the inner housing, a rotor rotatably disposed in the stator, a first air flow path through which air flows in an axial direction between the inner housing and the outer housing based on rotation of the impeller, and a second air flow path through which air is joined with the air of the first air flow path via an inside of the inner housing and a gap between the impeller and the inner housing based on rotation of the impeller. Accordingly, cooling of the stator can be facilitated by the air flow paths.

20 Claims, 26 Drawing Sheets

(56) References Cited

U.S. PATENT DOCUMENTS

2020/0400157 A1  12/2020  Tsuchida et al.

FOREIGN PATENT DOCUMENTS

| EP | 3376043 | | | 9/2018 | |
|---|---|---|---|---|---|
| JP | 10243595 | A | * | 9/1998 | |
| JP | 2004187345 | A | * | 7/2004 | |
| JP | 2011080427 | | | 4/2011 | |
| JP | 2018-150892 | | | 9/2018 | |
| KR | 20110101517 | A | * | 9/2011 | |
| KR | 10-2016-0097884 | | | 8/2016 | |
| KR | 20180105934 | | | 10/2018 | |
| WO | WO2005031948 | | | 4/2005 | |
| WO | WO-2005031948 | A1 | * | 4/2005 | ............... H02K 9/06 |
| WO | WO2020216588 | | | 10/2020 | |

OTHER PUBLICATIONS

Notice of Allowance in Korean Appln. No. 10-2020-0187834, dated Jan. 19, 2023, 9 pages (with English translation).
Gao et al., "Simulation analysis of motor cooling water jacket of permanent magnet direct driven wind turbine," Journal of Beijing Information Science & Technology University, Aug. 2020, 35(4):89-93 (with English abstract).
Office Action in Chinese Appln. No. 202111577363.8, dated Apr. 22, 2023, 14 pages (with English Translation).

* cited by examiner

ELECTRIC MOTOR ASSEMBLY

CROSS-REFERENCE TO RELATED APPLICATION

Pursuant to 35 U.S.C. § 119(a), this application claims the benefit of the earlier filing date and the right of priority to Korean Patent Application No. 10-2020-0187834, filed on Dec. 30, 2020, the contents of which are incorporated by reference herein in their entirety.

TECHNICAL FIELD

The present disclosure relates to an electric motor assembly.

BACKGROUND

A motor or an electric motor is a device that may convert electric energy into mechanical energy. For example, a motor may include a stator and a rotor rotatable relative to the stator.

The motor may have various sizes and weights according to the purpose of use.

In some cases, the motor may include a motor assembly that includes an impeller to generate pressure or to facilitate a flow of air during rotation.

In some cases where a stator and a rotor have reduced sizes, while the rotor rotates at a high speed to provide the air flow rate, temperatures of the stator and the rotor may increase, which may result in deterioration of the parts or components of the motor.

In some cases, additional parts may be added to cool the stator and the rotor, but the overall size and weight of the motor assembly may be increased. The increased number of parts may also lead to an increase in manufacturing costs.

In some cases, a motor assembly may be used in a handheld device such as a hair dryer, vacuum cleaner, etc., and the motor assembly may be called a micro motor assembly. For example, the external size and weight of the motor assembly may be reduced for the hair dryer and the vacuum cleaner to be held and used in one or both hands of a user.

In some cases, the amount of heat generated in the stator and the rotor may be increased based on an increase of a rotation speed of the impeller to provide the air flow rate.

SUMMARY

The present disclosure describes an electric motor assembly that can facilitate cooling of a stator without adding parts.

The present disclosure also describes an electric motor assembly that can facilitate cooling of a stator during operation and reduce a size of the stator to thereby achieve a micro electric motor assembly enabling a high-speed rotation.

The present disclosure also describes an electric motor assembly that can facilitate cooling of a stator and a bearing. For example, the electric motor assembly can flow air via an outside and an inside of an inner housing based on rotation of an impeller.

According to one aspect of the subject matter described in this application, an electric motor assembly includes an outer housing, an impeller disposed in the outer housing, an inner housing that is disposed in the outer housing and spaced apart from the impeller, where the inner housing is concentric with the outer housing, a stator disposed in the inner housing, and a rotor rotatably disposed in the stator, where the rotor and the stator define an air gap therebetween. The inner housing and the outer housing are spaced apart from each other to thereby define a first air flow path therebetween, where the first air flow path is configured to carry air in an axial direction based on rotation of the impeller. The inner housing defines a second air flow path that extends through an inside of the inner housing and includes a gap defined between the impeller and the inner housing, where the second air flow path is configured to, based on rotation of the impeller, carry air including the air discharged from the first air flow path.

Implementations according to this aspect can include one or more of the following features. For example, the electric motor assembly can include a rotating shaft coupled to the rotor and a bearing assembly that is disposed between the impeller and the rotor and configured to rotatably support the rotating shaft, where the inner housing defines a bearing assembly accommodating space that accommodates the bearing assembly. In some examples, the second air flow path can include an axial through section extending in the axial direction through the inside of the inner housing, where at least a portion of the axial through section is disposed radially outside the bearing assembly.

In some implementations, the stator can include a stator core having a plurality of slots and a plurality of teeth, and a stator coil that is wound around the stator core, where the second air flow path can further include a stator inner section that passes through an inside of the stator core. In some examples, the inner housing can include a protruding section that protrudes relative to an end portion of the outer housing in the axial direction, where the protruding section defines a stator accommodating space that accommodates the stator. For example, the axial through section can face one of the plurality of slots.

In some implementations, the stator coil can include a plurality of phase coils that are configured to be connected to a three-phase alternating (AC) power supply, where a cross-sectional area of the axial through section is less than a cross-sectional area of each of the plurality of phase coils. For example, the cross-sectional area of the axial through section can be 0.75 to 0.80 of the cross-sectional area of each of the plurality of phase coils.

In some implementations, the electric motor assembly can include an engaging part that is disposed between the inner housing and the stator and that engages the inner housing with the stator in a circumferential direction, where the stator is configured to move relative to the inner housing in the axial direction. For example, the engaging part can include (i) a coupling protrusion that protrudes from an inner surface of the inner housing in a radial direction and extends in the axial direction and (ii) a coupling recess that accommodates the coupling protrusion, where the coupling recess is recessed from an outer surface of the stator in the radial direction and extending in the axial direction.

In some implementations, the stator can include an insulator that insulates the stator core and the stator coil from each other, where the insulator is made by injection molding in a state in which the stator core is inserted into a mold.

In some implementations, the second air flow path can further include a bearing assembly cooling section defined around the bearing assembly accommodating space and configured to cool the bearing assembly. For example, the bearing assembly cooling section can be arranged offset from the axial through section in a circumferential direction.

In some examples, the bearing assembly can include a first bearing and a second bearing that are spaced apart from each other in the axial direction, and a spacer disposed between the first bearing and the second bearing, where each of the first bearing and the second bearing is a ball bearing including an outer ring, an inner ring, and a ball disposed between the outer ring and the inner ring. The bearing assembly cooling section can radially extend from an inner surface of the bearing assembly accommodating space that faces the outer ring of each of the first bearing and the second bearing. The bearing assembly cooling section can be configured to carry air in contact with the outer ring of each of the first bearing and the second bearing. In some examples, the spacer can define a vent hole that enables communication of air therethrough.

In some implementations, the impeller can define a cavity that has an annular shape extending in a circumferential direction and that is recessed from a surface of the impeller facing the inner housing in the axial direction. In some examples, the electric motor assembly can include a rotating shaft coupled to the rotor, and the impeller can include a boss that faces the cavity and that surrounds a circumference of the rotating shaft. The inner housing can include a blocking rib that protrudes in the axial direction and extends in the circumferential direction, where the blocking rib is inserted into the cavity between the boss and an inner surface of the inner housing.

In some implementations, the axial through section can be spaced apart from the bearing assembly accommodating space in a radial direction by a predetermined distance. For example, the predetermined distance between the axial through section and the bearing assembly accommodating space can be greater than or equal to 0.5 mm and less than or equal to 1.5 mm.

In some implementations, an axial length of the inner housing can be greater than an axial length of the outer housing, and at least a portion of the second air flow path can be disposed outside the outer housing in the axial direction.

In some examples, when the impeller rotates, air introduced into the inner housing flows to the impeller side through the axial through section via the stator.

With this configuration, cooling of the bearing assembly and the inner housing can be facilitated, allowing the bearing assembly and the inner housing to maintain a relatively low temperature.

In addition, as the inner housing is provided with the axial through section defined through the inner housing in the axial direction, weight of the inner housing can be reduced by that much.

In some implementations, the stator can include a stator core having a plurality of slots and teeth, and a stator coil wound around the plurality of teeth.

The second air flow path can include a stator inner section that passes through an inside of the stator core.

The stator inner section can include an air gap defined between the stator and the rotor and an empty space in the slots excluding the stator coil.

Accordingly, when the impeller rotates, air introduced into the inner housing can pass through the stator inner section and move toward the impeller through the axial through section.

With this configuration, when the impeller rotates, the air introduced into the inner housing can flow through the air gap between the stator and the rotor, and the empty space between the slot and the stator coil, thereby facilitating cooling of the stator and the rotor.

In some examples, as the stator coil, which has a relatively high temperature as an electric heating element, is brought into direct contact with air flowing along the stator inner section, cooling of the stator coil can be significantly enhanced.

Accordingly, the stator coil can maintain a relatively low temperature.

In some implementations, the inner housing can include a protruding section protruding outward from an end portion of the outer housing in the axial direction.

The protruding section can be provided therein with a stator accommodating portion in which the stator is accommodated.

The axial through section can be provided to correspond to the slot.

An extension line of extending an edge of the axial through section in the axial direction can be disposed in the slot.

Thus, air that has passed through the empty space of the slot can be easily moved to the axial through section.

In some implementations, an engaging part can be provided between the inner housing and the stator such that the inner housing and the stator are engaged with each other in a circumferential direction so as to be relatively movable in the axial direction.

This can allow the stator and the inner housing to be properly coupled to a preset coupling position.

With this configuration, the axial through section of the inner housing can be disposed to correspond to the slot of the stator, enabling a smooth air flow of the second air flow path.

In some implementations, the engaging part can include a coupling protrusion protruding from an inner surface of the inner housing in a radial direction and extending in the axial direction, and a coupling recess recessed into an outer surface of the stator in the radial direction and extending in the axial direction to accommodate the coupling protrusion.

In some examples, the coupling protrusion accommodating protrusion can be provided to each corresponding position of the plurality of teeth of the stator core.

Accordingly, an increase in magnetic reluctance of the magnetic flux flowing along the plurality of teeth can be suppressed.

In some implementations, the stator can include an insulator for insulating the stator core and the stator coil, and the insulator can be injection molded by inserting the stator core into a mold.

When an insulator is separately manufactured to correspond to a size of the stator core for insulating the stator core having a relatively small size, which may take a relatively long time for assembly since the stator core and the insulator are very small in size. However, according to one implementation of the present disclosure, the assembly process of the stator core and the insulator can be excluded.

In some implementations, the second air flow path can include a bearing assembly cooling section defined around the bearing assembly accommodating portion so as to facilitate cooling of the bearing assembly.

As a result, cooling of the bearing assembly can be enhanced.

In some examples, the bearing assembly cooling section can be defined inside the axial through section along the radial direction, and be spaced apart from the axial through section in the circumferential direction.

Thus, an increase in vibration and noise due to a reduction in wall thickness (thickness) between the axial through section and the bearing assembly accommodating portion can be suppressed or reduced.

In some implementations, the bearing assembly can include a first bearing and a second bearing spaced apart from each other in the axial direction, and a spacer that is inserted between the first bearing and the second bearing.

With this configuration, the bearing assembly can have a long length in the axial direction to thereby support the rotating shaft over a relatively long length in the axial direction, allowing transverse displacement of the rotating shaft to be effectively suppressed. Thus, transverse displacement of the impeller and the rotor can be suppressed.

Each of the first bearing and the second bearing can be configured as a ball bearing including an outer ring, an inner ring, and a ball.

This can allow rotational resistance caused when the rotating shaft rotates to be suppressed.

The bearing assembly cooling section can be defined by cutting an inner surface of the bearing assembly accommodating portion so as to allow air to be in contact with the outer rings of the first bearing and the second bearing.

Accordingly, the outer ring of the first bearing and the outer ring of the second bearing can be brought into direct contact with flowing air to thereby facilitate cooling of the first bearing and the second bearing.

In some implementations, the spacer can be provided with a through portion (or hole) to allow air to pass therethrough.

This can allow movement of air in the bearing assembly cooling section to be facilitated.

With this configuration, a flow amount of air in contact with the bearing assembly can be increased to thereby facilitate cooling of the bearing assembly.

In some implementations, the impeller can be provided with a cavity having an annular shape, recessed into a surface facing the inner housing in the axial direction, and extending in a circumferential direction.

This can allow a direction of air that has passed through the axial through section to be easily changed.

With this configuration, the flow resistance of air passing through the axial through section can be reduced.

Thus, movement of air passing through the second air flow path can be facilitated, and cooling of the stator and the bearing assembly can be enhanced.

In some implementations, the cavity can be provided therein with a boss in which a rotating shaft is accommodated.

The inner housing can be provided with a blocking rib protruding in the axial direction and extending in the circumferential direction so as to block between the boss and the inner housing.

This can prevent or reduce foreign substances from being introduced between the impeller and the inner housing. In some examples, constraint (or stuck) due to the inflow of foreign substances between the impeller and the inner housing can be suppressed.

In some implementations, the axial through section can be spaced apart from the bearing assembly accommodating portion in the radial direction of the inner housing by a predetermined distance.

In some examples, the predetermined distance between the axial through section and the bearing assembly accommodating portion can be 0.5 mm or more and 1.5 mm or less.

This can result in preventing generation of vibration and noise of the inner housing when the impeller rotates.

Further, a movement speed of air passing through the axial through section can be increased.

In some implementations, as a stator is provided in an inner housing, and a first air flow path through which air flows to an outside of the inner housing and a second air flow path through which air flows via an inside of the inner housing when an impeller rotates, cooling of the stator in the inner housing can be facilitated.

In some implementations, the second air flow path can have an axial through section defined through the inner housing in an axial direction to thereby facilitate heat dissipation of the inner housing.

This can allow temperatures of components provided in the inner housing to be reduced.

As the inner housing is provided with the axial through section, weight of the inner housing can be remarkably reduced.

As the axial through section corresponds to a slot of the stator, the flow resistance of air of the second air flow path flowing into the inner housing can be reduced.

In some implementations, as an engaging part is provided between the inner housing and the stator such that the inner housing and the stator are engaged with each other in a circumferential direction so as to be relatively movable in the axial direction, the stator can be accurately coupled to an inside of the inner housing in a preset position.

Further, the second air flow path can have a bearing assembly cooling section capable of facilitating cooling of the bearing assembly, thereby enhancing cooling of the bearing assembly.

As the bearing assembly cooling section is spaced apart from the axial through section in the circumferential direction, vibration and noise of the inner housing due to a decreased thickness of the bearing assembly accommodating portion and the axial through section can be suppressed.

In some implementations, the bearing assembly cooling section can be defined by cutting an inner surface of the bearing assembly accommodating portion, allowing an outer ring of a bearing and air to be in direct contact. As a result, cooling of the bearing can be remarkably enhanced.

In some examples, as a cavity having an annular shape, recessed into a surface of the impeller facing the inner housing in the axial direction, and extending in the circumferential direction is provided, a direction of air that has passed through the axial through section can be easily changed, allowing flow resistance of the second flow path to be reduced.

Thus, movement of air flowing along the second air flow path can be facilitated to thereby facilitating cooling of the stator and the bearing assembly.

As the axial through section is spaced apart from the bearing assembly accommodating portion in a radial direction by a predetermined distance, generation of vibration and noise in the inner housing when the impeller rotates can be suppressed or reduced.

Further, the flow resistance of air can be reduced to thereby increase a movement speed of air passing through the axial through section.

BRIEF DESCRIPTION OF THE DRAWINGS

FIG. 6 is a partially-cut view illustrating an example of an inside of the inner housing of

FIG. 5.

DETAILED DESCRIPTION

Hereinafter, one or more implementations of the present disclosure will be described in detail with reference to the accompanying drawings.

Figure 1:
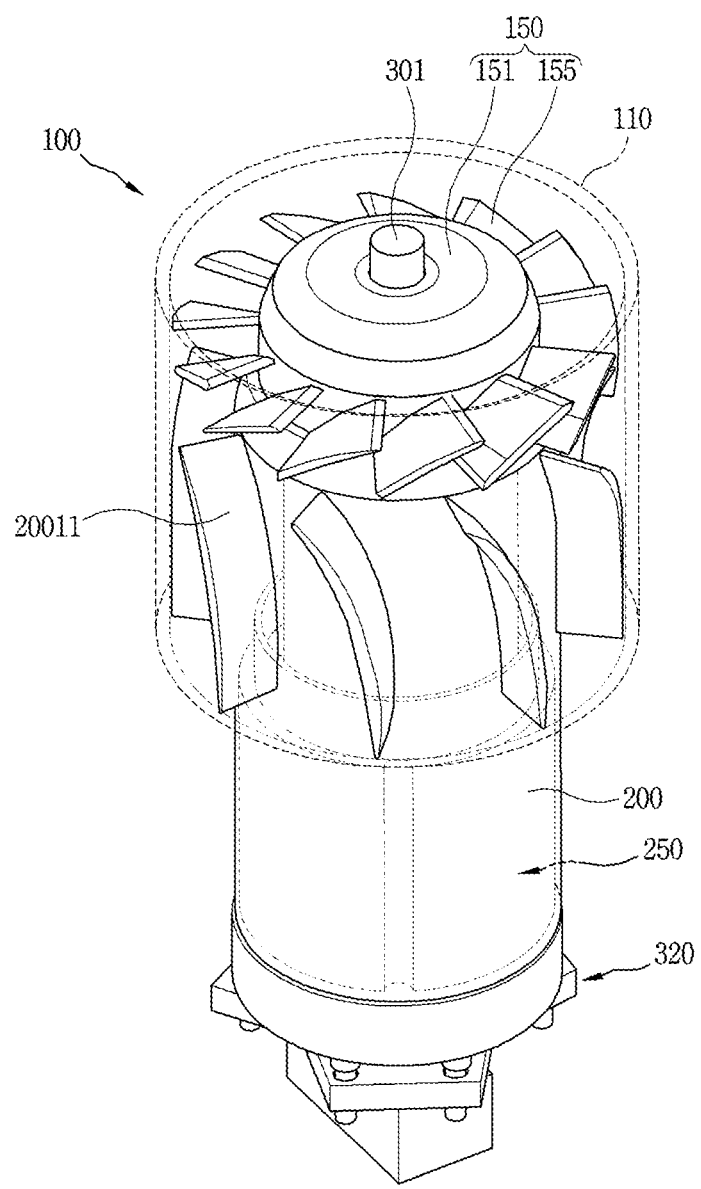
FIG. 1 is a perspective view of an example of an electric motor assembly.
Figure 2:
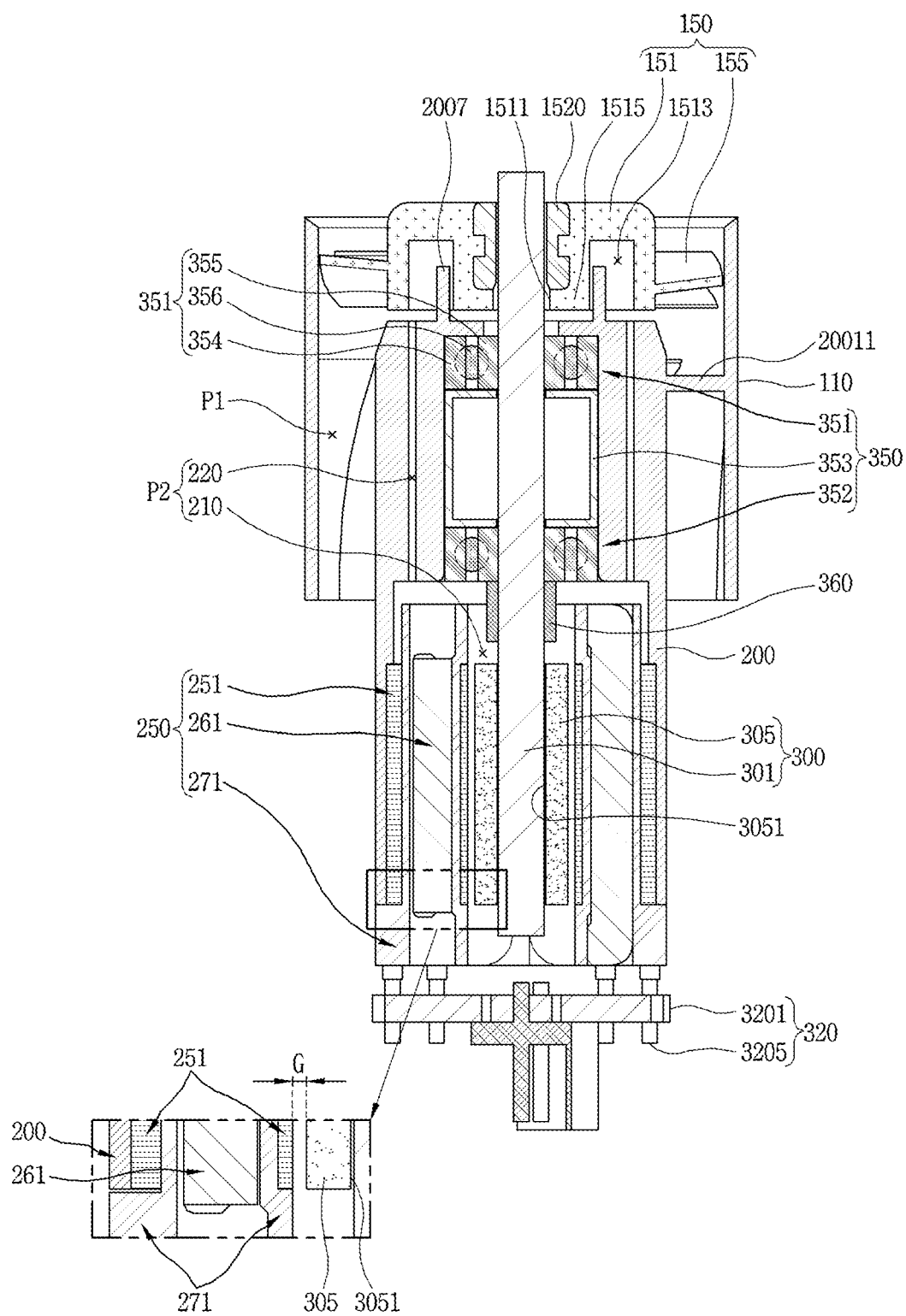
FIG. 2 is a cross-sectional view of FIG. 1.
Figure 3:
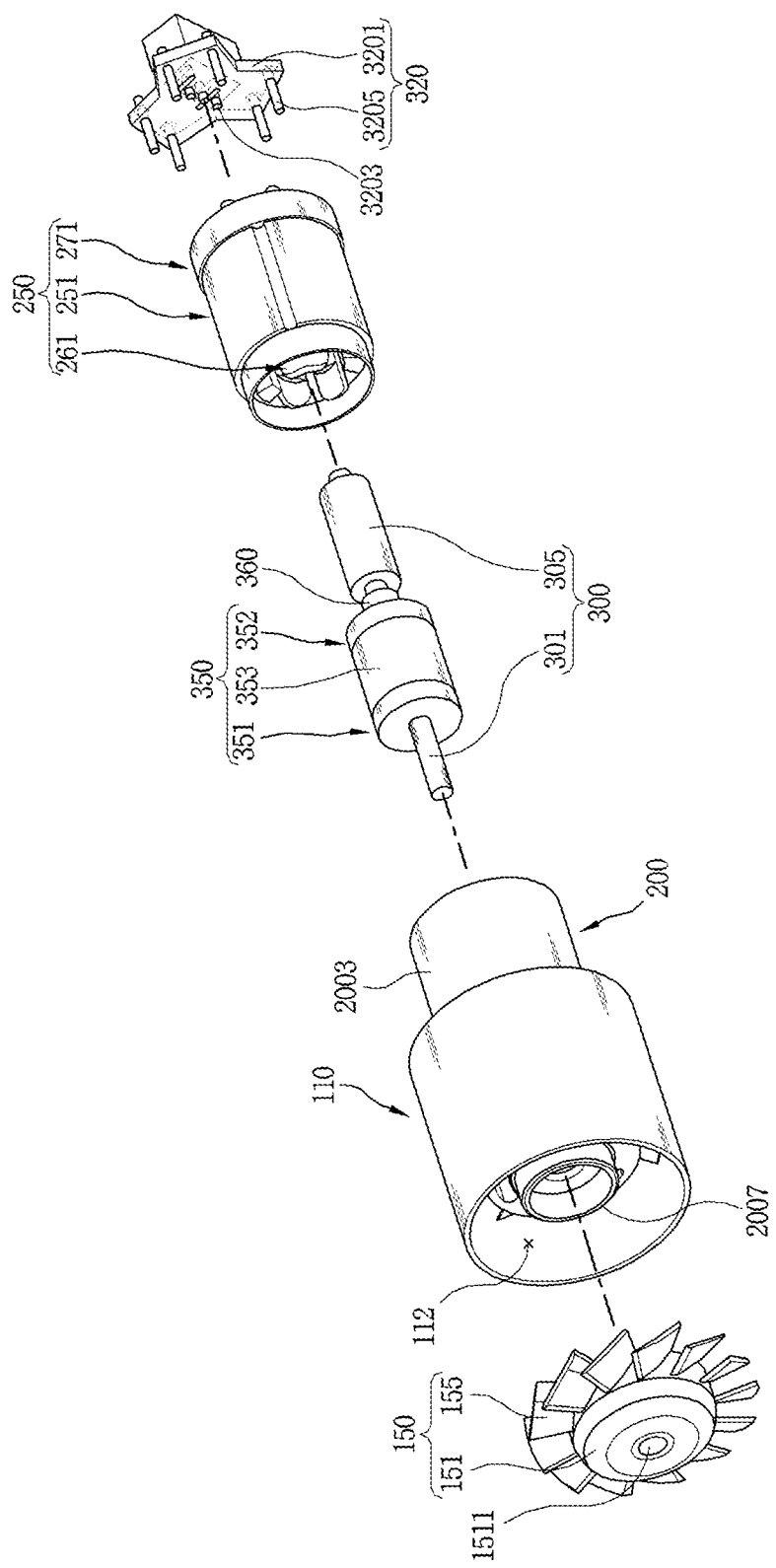
FIG. 3 is an exploded perspective view of FIG. 2.

FIG. 1 is a perspective view of an example of an electric motor assembly, FIG. 2 is a cross-sectional view of FIG. 1, and FIG. 3 is an exploded perspective view of FIG. 2. As illustrated in FIGS. 1 to 3, an electric motor assembly 100 includes an outer housing 110, an impeller 150, an inner housing 200, a stator 250, and a rotor 300.

In some examples, the outer housing 110 may have a cylindrical shape. For instance, the outer housing 110 can have a cylindrical shape with both sides open. The impeller 150 can be rotatably disposed in the outer housing 110.

In some implementations, the impeller 150 can be disposed in one end portion of the outer housing 110. The impeller 150 can be configured to suction air along an axial direction and discharge the air in the axial direction, for example. In some examples, the impeller 150 can include a hub 151 and a plurality of blades 155 disposed around the hub 151 in a spaced manner.

The inner housing 200 can be disposed in the outer housing 110. For example, the inner housing 200 can be concentrically coupled to the outer housing 110. The inner housing 200 can have, for example, a cylindrical shape with one side open.

The inner housing 200 can be provided therein with an accommodation space having a cylindrical shape. The inner housing 200 can have a smaller inner diameter than the outer housing 110.

The impeller 150 and the inner housing 200 can be disposed in the outer housing 110 to be spaced apart from each other in the axial direction.

When the impeller 150 rotates, air can flow into the outer housing 110 along the axial direction.

In some implementations, a first air flow path P1 through which air flows along the axial direction when the impeller 150 rotates can be defined between the inner housing 200 and the outer housing 110.

In some implementations, the electric motor can include a vane 20011 configured to guide movement of air when the impeller 150 rotates, and the vane 20011 can be provided between the inner housing 200 and the outer housing 110. In some examples, the vane 20011 can be provided in plurality, and the plurality of vanes 20011 can be spaced apart from one another in a circumferential direction of the inner housing 200. In some examples, the vane 20011 can have a shorter side extending in a radial direction and a longer side extending in the axial direction. A length of the shorter side is less than a length of the longer side.

One side (or lateral) portion of the vane 20011 is connected to an outer surface of the inner housing 200 and another side portion thereof is connected to an inner surface of the outer housing 110.

Figure 4:
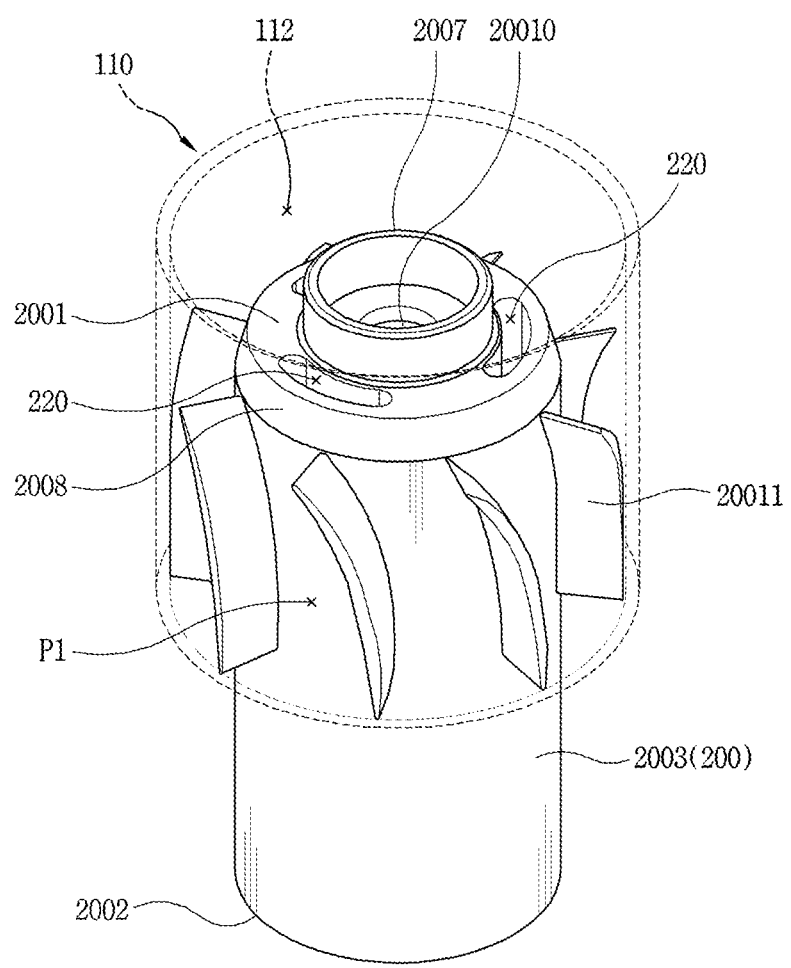
FIG. 4 is a perspective view of an example of an inner housing of FIG. 3.

In some implementations, the inner housing 200 can include a closed end portion 2001 (see FIG. 4) and an open end portion 2002 (see FIG. 4). In some examples, the inner housing 200 can be configured such that the closed end portion 2001 is disposed adjacent to the impeller 150 in the axial direction. The open end portion 2002 of the inner housing 200 can be disposed at a side far away from the impeller 150 in the axial direction. In some examples, the inner housing 200 can include a protruding section 2003 that protrudes outward from an end portion of the outer housing 110 in the axial direction. The stator 250 and the rotor 300 can be disposed in the protruding section 2003 of the inner housing 200.

The protruding section 2003 is provided therein with a stator accommodating portion 2005 in which the stator 250 is accommodated. The stator accommodating portion 2005 can be a space that accommodates the stator 250 or a portion of the protruding section 2003 defining such a space.

In some examples, the stator 250 can include a stator core 251 and a stator coil 261 wound around the stator core 251. In some examples, the stator 250 can include, for example, an insulator 271 for insulating the stator core 251 and the stator coil 261. The stator coil 261 can be configured to be connected to a three-phase AC power supply (or source), for example. In some examples, the stator coil 261 can include three phase coils 2611 respectively connected to phases (e.g., U phase, V phase, and W phase) of the three-phase AC power supply.

In some implementations, a rotor accommodating hole 253 can be defined in the stator core 251 so that the rotor 300 is rotatably accommodated with a specific or predetermined air gap G. The insulator 271 can be manufactured by injection molding after inserting the stator core 251 into a mold, for example.

In some implementations, the rotor 300 is provided inside the stator 250. For instance, the rotor 300 includes a rotating shaft 301 and a permanent magnet 305 coupled to the rotating shaft 301. In some examples, the permanent magnet 305 can have a cylindrical shape.

In some implementations, the electric motor assembly 100 of the implementation can be configured as a micro electric motor assembly having the stator 250 with an outer diameter of 39 mm and the rotor 300 with an outer diameter of 9.5 mm. For example, the electric motor assembly 100 can be configured as a high-speed rotation motor. More specifically, the stator 250 and the rotor 300 can be configured to rotate at 120 krpm to 185 krpm, for example.

In some examples, a rotating shaft hole 3051, which accommodates the rotating shaft 301, can be defined in the permanent magnet 305. In some examples, the permanent magnet 305 can have a long length in the axial direction, and the rotating shaft hole 3051 is defined through the permanent magnet 305 in the axial direction.

In some implementations, the stator 250 and the rotor 300 are configured as a micro electric motor assembly 100 having a relatively small size, and the rotor 300 is provided with the rotating shaft 301 and the permanent magnet 305. However, this is merely illustrative, and the rotor can have a rotor core defined by stacking a plurality of electrical steel plates in an insulating manner, and a permanent magnet can be coupled to the rotor core.

In some implementations, a printed circuit board (PCB) 320 can be provided at one side of the stator 250. For example, as illustrated in FIG. 3, the PCB 320 includes a substrate 3201 having an electric circuit, and a plurality of connecting pins 3205 protruding from the substrate 3201. In some examples, the substrate 3201 can have a "Y" shape.

In some examples, the substrate 3201 can be provided with a plurality of circuit components 3203 constructing an electric circuit. In some examples, the plurality of connecting pins 3205 can protrude in the axial direction and be electrically connected to the stator coil 261. The plurality of connecting pins 3205 can be implemented as three pairs, for example.

In some implementations, three of the plurality of connecting pins 3205 can be respectively connected to one end portions (power line) of the phase coils 2611 (U phase, V phase, and W phase) of the stator coil 261, for example.

The other three of the plurality of connecting pins 3205 can be respectively connected to the other end portions (neutral line) of the phase coils 2611 (U-phase, V-phase, and W-phase) of the stator coil 261, for example.

The impeller 150 can be made of a synthetic resin member (or material), for example.

A rotating shaft accommodating portion 1511 in which the rotating shaft 301 is accommodated can be defined through the hub 151 in the axial direction. The rotating shaft accommodating portion 1511 be a space that accommodates the rotating shaft 301 or a portion of the hub 151 defining such a space.

The impeller 150 can be provided with, for example, a rotating shaft coupling member 1520 that is coupled to the rotating shaft 301.

The rotating shaft coupling member 1520 can be defined of a metal member, for example.

The impeller 150 can be manufactured by injection molding after inserting the rotating shaft coupling member 1520 into a mold.

Accordingly, strength of the hub 151 of the impeller 150 can be increased, and a coupling force between the impeller 150 and the rotating shaft 301 can be increased.

As the impeller 150 includes the rotating shaft coupling member 1520 defined of the metal member, the mass of the impeller 150 can be increased. Thus, the impeller 150 can a have preset or predetermined magnitude (or size) of inertia (rotational inertia) to thereby enable stable rotation.

In the impeller 150 (the hub 151), a cavity 1513 is defined on a surface facing the inner housing 200, for example.

The cavity 1513 is recessed in the axial direction and extends in a circumferential direction, for example.

That is, the cavity 1513 has a ring shape or a circular annular shape, for example.

A boss 1515 disposed in a circumference of the rotating shaft 301 is provided in the cavity 1513.

A blocking rib 2007 that blocks a gap between the boss 1515 and the inner housing 200 is provided in the cavity 1513.

This can prevent foreign substances from being introduced between the impeller 150 (boss 1515) and the inner housing 200.

With this configuration, constraint (or stuck) due to foreign substances inserted between the boss 1515 of the impeller 150 and the inner housing 200 can be suppressed.

The blocking rib 2007 is provided at the closed end portion 2001 of the inner housing 200, for example.

The blocking rib 2007 protrudes from an impeller-side end portion (closed end portion 2001) in the axial direction and extends in the circumferential direction.

The blocking rib 2007 can have a cylindrical shape that is open toward the impeller 150.

A bearing assembly 350 that supports the rotating shaft 301 is provided between the impeller 150 and the rotor 300.

The inner housing 200 is provided with a bearing assembly accommodating portion 2009 in which the bearing assembly 350 is accommodated. The bearing assembly accommodating portion 2009 can be a space that accommodates the bearing assembly 350 or a portion of the inner housing 200 defining such a space.

The electric motor assembly 100 includes a first air flow path P1 and a second air flow path P2 through which air flows when the impeller 150 rotates.

FIG. 4 is a perspective view of the inner housing of FIG. 3. As illustrated in FIG. 4, the inner housing 200 is longer in length than the outer housing 110.

An impeller accommodating space 112 in which the impeller 150 is accommodated is defined at one inner end portion of the outer housing 110.

The inner housing 200 is accommodated at one side of the impeller accommodating space 112.

The inner housing 200 is concentrically disposed in the outer housing 110.

The inner housing 200 has a cylindrical shape with a closed upper side and an open lower side in the drawing.

The inner housing 200 has a constant (or identical) outer diameter.

A rotating shaft hole 20010 in which the rotating shaft 301 is accommodated is defined through the closed end portion 2001 of the inner housing 200.

A blocking rib 2007 that protrudes in the axial direction and extends in the circumferential direction is provided in a circumference of the rotating shaft hole 20010.

This can prevent foreign substances from being introduced into the rotating shaft hole 20010.

An axial through section 220 defined through the inner housing 200 in the axial direction is provided at an outside of the blocking rib 2007.

A plurality of axial through sections 220 can be provided at the outside of the blocking rib 2007 to be spaced apart from one another in the circumferential direction.

The closed end portion 2001 of the inner housing 200 is provided with an inclined guide surface 2008 that is inclined outward and extends in the circumferential direction.

The inclined guide surface 2008 can have a minimum outer diameter that is substantially the same as an outer diameter of the hub 151 of the impeller 150.

A maximum outer diameter of the inclined guide surface 2008 can be substantially the same as an outer diameter of the inner housing 200.

Accordingly, air can flow smoothly when the impeller 150 rotates.

A plurality of vanes 20011 are provided at an outer surface of the inner housing 200.

Each of the plurality of vanes 20011 is inclined with respect to the axial direction.

The plurality of vanes 20011 can be inclined along a rotation direction of the impeller 150, for example.

In detail, when the impeller 150 rotates counterclockwise in the drawing, each of the plurality of vanes 20011 can be inclined such that an end close to the impeller 150 is disposed on the left in the drawing and an end far away from the impeller 150 is disposed on the right side in the drawing.

The first air flow path P1 is configured such that air passes between the inner housing 200 and the outer housing 110 when the impeller 150 rotates.

The second air flow path P2 is configured such that air passes through an inside of the inner housing 200 when the impeller 150 rotates. The second air flow path P2 is defined through the inner housing 200 in the axial direction.

The second air flow path P2 is defined such that air is introduced from a lower part of the inner housing 200 along the axial direction in the drawing and is discharged to an upper end of the inner housing 200.

That is, when the impeller 150 rotates, an air (flow) direction of the first air flow path P1 at an outside of the protruding section 2003 of the inner housing 200 and an air direction of the second air flow path P2 at an inside of the protruding section 2003 are opposite to each other.

Figure 5:
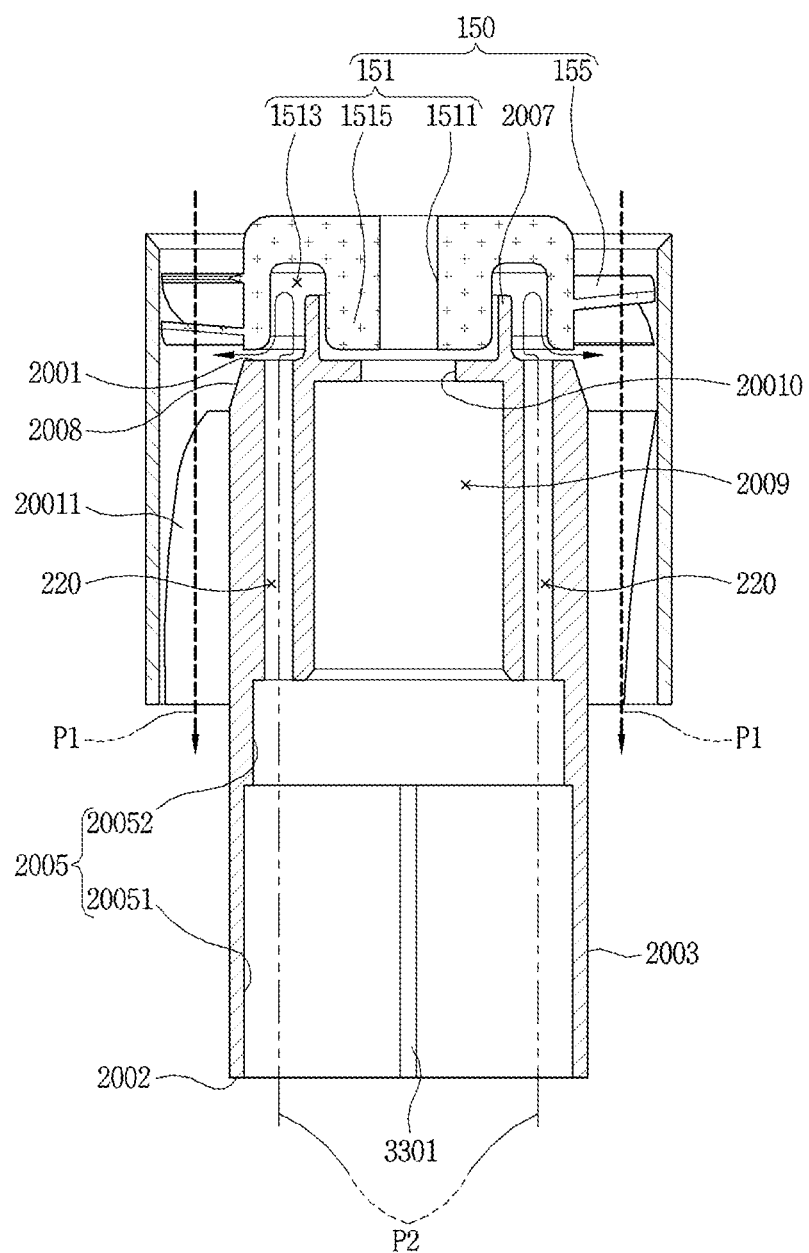
FIG. 5 is a cross-sectional view illustrating examples of an impeller, an outer housing, and the inner housing of FIG. 3.
Figure 6:
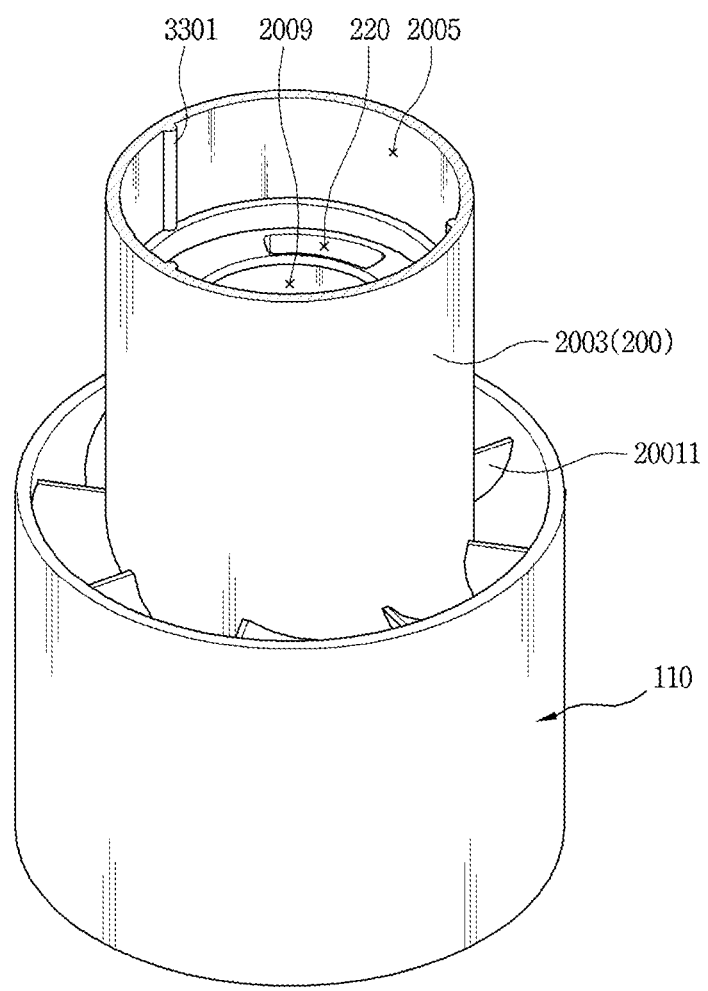

FIG. 5 is a cross-sectional view illustrating examples of the impeller, the outer housing, and the inner housing of FIG. 3, and FIG. 6 is a partially-cut view illustrating an example of an inside of the inner housing of FIG. 5. As illustrated in FIGS. 5 and 6, the impeller 150 and the inner housing 200 are disposed in the outer housing 110 to be spaced apart from each other in the axial direction by a predetermined distance.

In some examples, the predetermined distance between the impeller 150 and the inner housing 200 can be, for example, 0.7 mm or more.

The cavity 1513 is provided on a surface of the impeller 150 facing the inner housing 200.

The second air flow path P2 includes the cavity 1513.

In detail, the second air flow path P2 is configured to pass through the inside of the inner housing 200, and the cavity 1513, and a gap between the impeller 150 and the inner housing 200.

A stator accommodating portion 2005 in which the stator 250 is accommodated is defined inside the inner housing 200.

The stator accommodating portion 2005 includes, for example, a stator core accommodating section 20051 in which the stator core 251 is accommodated.

The stator accommodating portion 2005 includes an insulator accommodating section 20052 in which the insulator 271 protruding to one side (upper side in the drawing) of the stator core 251 is accommodated.

Accordingly, the axial through section 220 and the stator core 251 can be spaced apart from each other by a distance corresponding to the insulator accommodating section 20052.

In some implementations, the insulator accommodating section 20052 can be greater than or equal to 5.6 mm, for example.

In some examples, the insulator accommodating section 20052 can have an inner diameter smaller than an inner diameter of the stator core accommodating section 20051.

Accordingly, the stator core 251 is brought into contact with the stator core accommodating section 20051 when the stator 250 is coupled to the inside of the inner housing 200, thereby preventing excessive insertion of the stator 250.

A bearing assembly accommodating portion 2009 in which the bearing assembly 350 is accommodated is defined on one inner side (upper side in the drawing) of the inner housing 200.

The bearing assembly accommodating portion 2009 can have an inner diameter smaller than an inner diameter of the stator accommodating portion 2005 (the insulator accommodating section 20052), for example.

When the impeller 150 rotates, pressure in a rotation region of the blade 155 of the impeller 150 is lowered, and air in a front region of the impeller 150 is suctioned in the axial direction and is then discharged to a rear region of the impeller 150.

Accordingly, pressure (negative pressure) lower than atmospheric pressure is defined between the impeller 150 and the inner housing 200.

A portion or part of the second air flow path P2 is defined inside the inner housing 200, so that air can move from the back of the impeller 150 in the radial direction via the inside of the inner housing 200, and then join or merge with air of the first air flow path P1 when the impeller 150 rotates.

More specifically, the second air flow path P2 can include a region or area where air is introduced from a lower end of the inner housing 200, the inside of the inner housing 200, and a space (gap) between the impeller 150 and the inner housing 200.

The second air flow path P2 includes, for example, the axial through section 220.

The axial through section 220 is defined axially through the inner housing 200 at an outside of the bearing assembly 350 in a radial direction of the inner housing.

Accordingly, when the impeller 150 rotates, the inside of the inner housing 200 and the space between the impeller 150 and the inner housing 200 communicate with each other through the axial through section 220.

With this configuration, when the impeller 150 rotates, the inside of the inner housing 200 communicates with the gap (space) between the impeller 150 and the inner housing 200, so that air inside the inner housing 200 can be moved or introduced into the gap (space) between the impeller 150 and the inner housing 200 through the axial through section 220 by a pressure difference.

A coupling protrusion 3301 that protrudes in the radial direction and extends in the axial direction is provided in the stator accommodating portion 2005.

Figure 7:
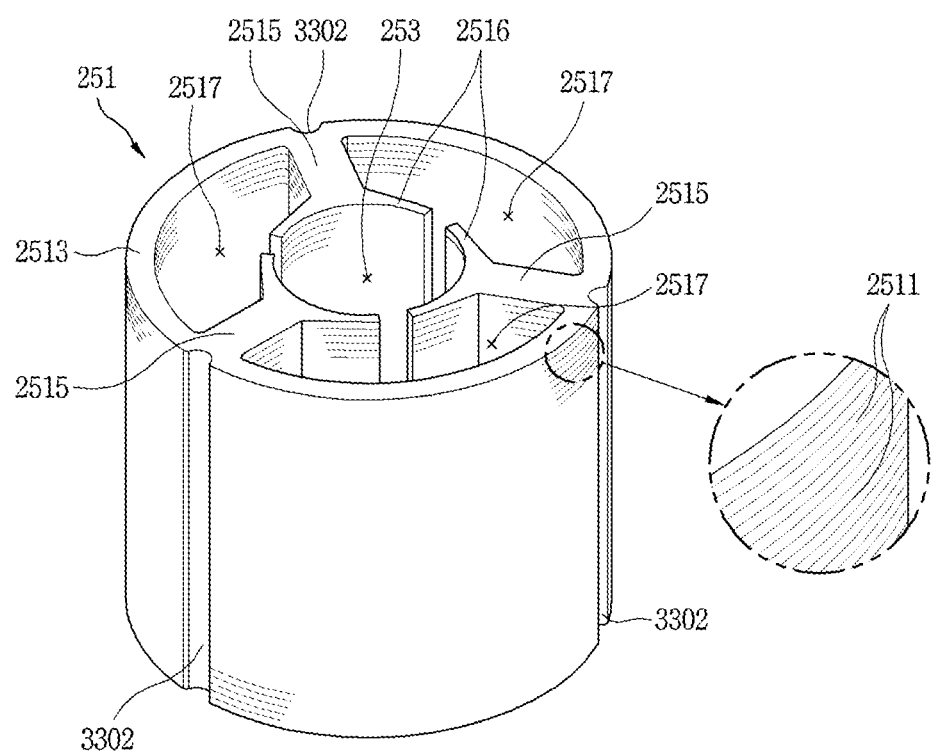
FIG. 7 is a perspective view of an example of a stator core of FIG. 2.
Figure 8:
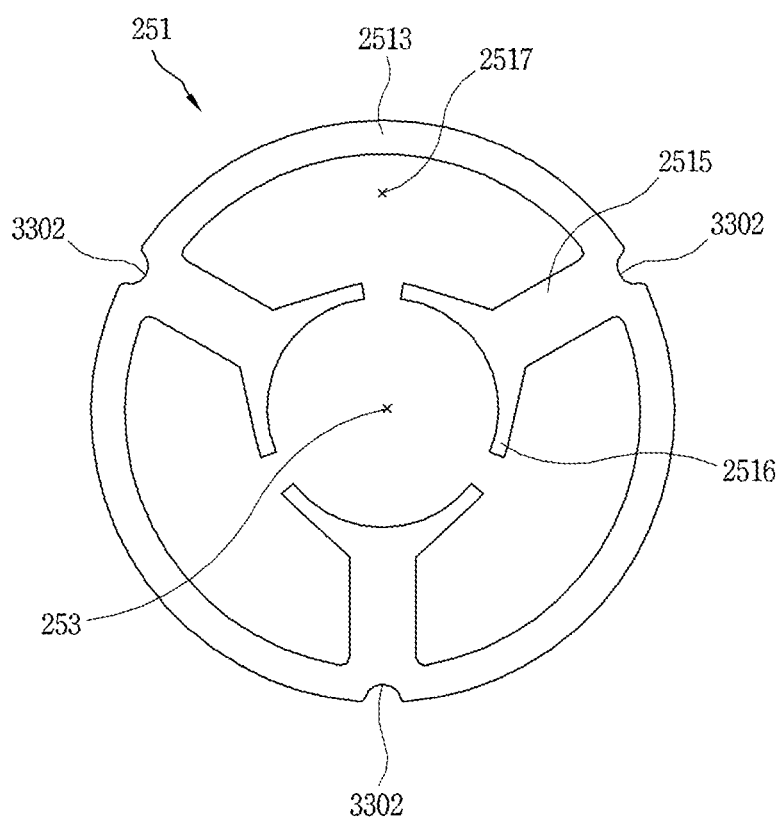
FIG. 8 illustrates the stator core of FIG. 7 viewed from one side.

More specifically, the coupling protrusion 3301 can be defined in the stator core accommodating section 20051, for example, FIG. 7 is a perspective view of an example of a stator core of FIG. 2, and FIG. 8 illustrates the stator core of FIG. 7 viewed from one side (or direction). As illustrated in FIG. 7, the stator core 251 includes a yoke 2513 and a plurality of teeth 2515 protruding from an inner surface of the yoke 2513 in the radial direction.

The yoke 2513 has a circular ring shape, for example.

An outer surface of the yoke 2513 can have, for example, a shape (circular cross-section) corresponding to a shape of an inner surface of the inner housing 200.

The plurality of teeth 2515 can be three in number.

Slots 2517 are respectively defined between two adjacent teeth 2515 along a circumferential direction of the yoke 2513.

The slots 2517 can be three in number.

A rotor accommodating hole 253 is defined at end portions (inner end portions) of the plurality of teeth 2515, so that the rotor 300 can be rotatably accommodated with the air gap G.

Shoes 2516 respectively extending to both sides in the circumferential direction are provided at an end portion of each of the plurality of teeth 2515.

An inner surface of the shoes 2516 has, for example, an arcuate shape that corresponds to a rotation radius of the permanent magnet 305 of the rotor 300.

The air gap G is defined between the inner surface of the shoes 2516 and an outer surface of the permanent magnet 305.

The inner surfaces of the shoes 2516 define the rotor accommodating hole 253.

The stator core 251 can be defined by stacking in an insulating manner a plurality of electrical steel plates 2511 each having the yoke 2513, and the teeth 2515, for example.

In some implementations, the stator 250 (stator core 251) can be coupled to the inner housing 200 along the axial direction.

For example, an engaging part can be provided between the inner housing and the stator such that the inner housing and the stator are engaged with each other in the circumferential direction so as to be relatively movable in the axial direction.

This is to allow the inner housing 200 and the stator 250 to be coupled to each other at a predetermined position along the circumferential direction.

The engaging part 330 can include, for example, a coupling protrusion 3301 that protrudes from the inner surface of the inner housing 200 in the radial direction and extends in the axial direction, and a coupling recess 3302 that is recessed into the outer surface of the stator 250 in the radial direction and extends in the axial direction so as to allow the coupling protrusion 3301 to be accommodated therein.

A coupling recess 3302 recessed in the radial direction and extending in the axial direction is provided at the outer surface of the stator core 251.

The coupling recess 3302 can be provided in plurality to correspond to the plurality of teeth 2515, for example.

In some implementations, the plurality of coupling recesses 3302 can be three in number, for example.

The coupling recesses 3302 can each have, for example, an arcuate cross-sectional shape.

In some examples, a center of the coupling recess 3302 in a circumferential direction of the stator core 251 can coincide with a center of the tooth 2515 in the circumferential direction of the stator core 251.

Accordingly, an increase in magnetic resistance (or magnetic reluctance) of the flux flowing along the teeth 2515 can be suppressed.

Figure 9:
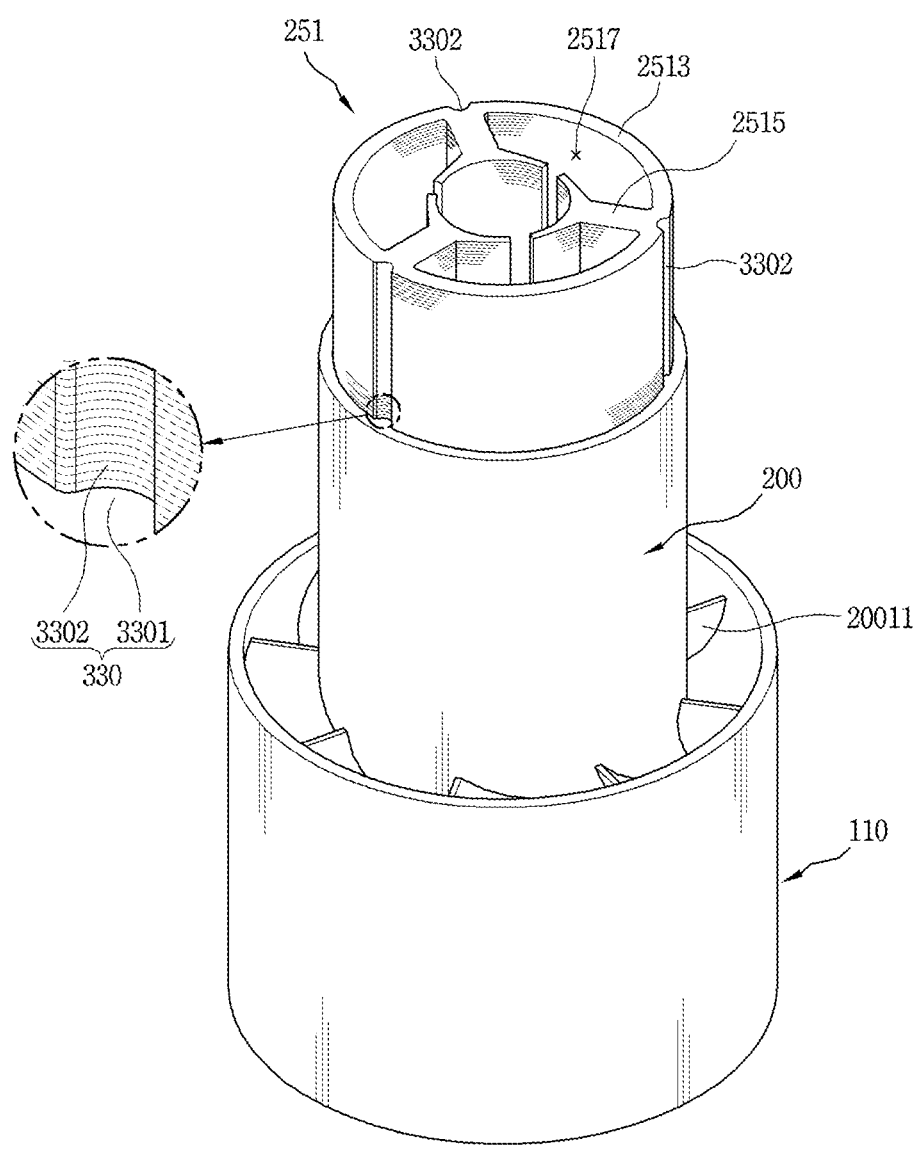
FIG. 9 is a view for explaining an example of coupling between the inner housing and the stator core of FIG. 2.
Figure 10:
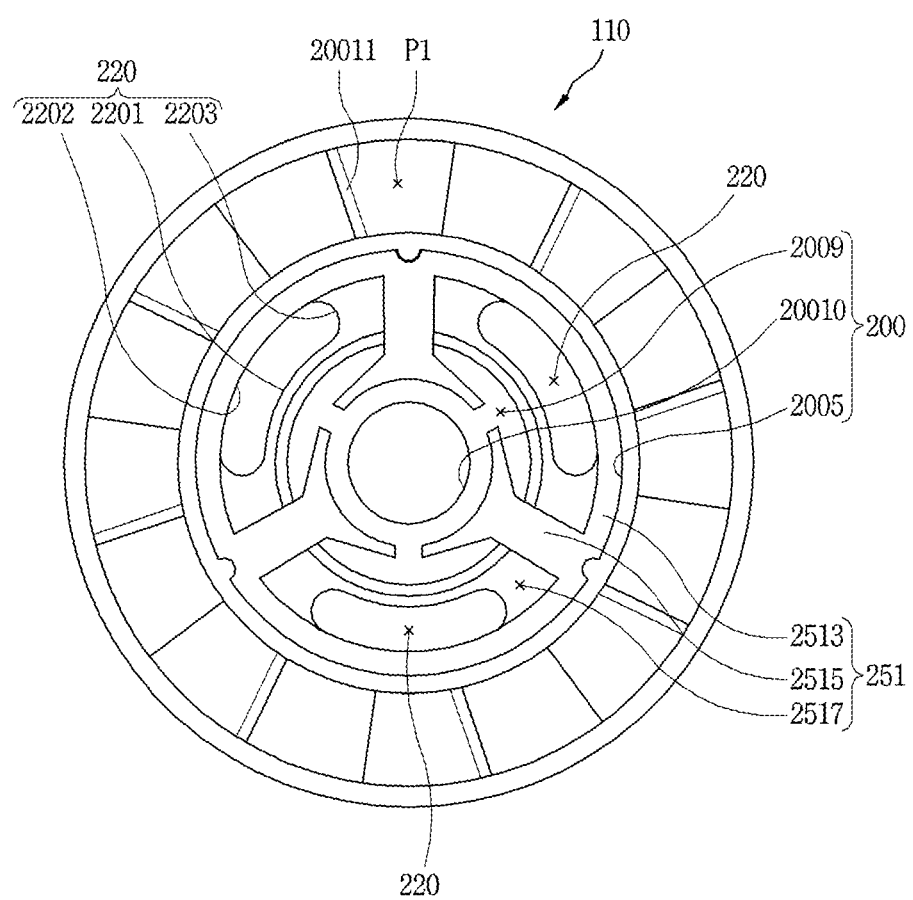
FIG. 10 illustrates an example of a coupled state of FIG. 9, viewed from one side.
Figure 11:
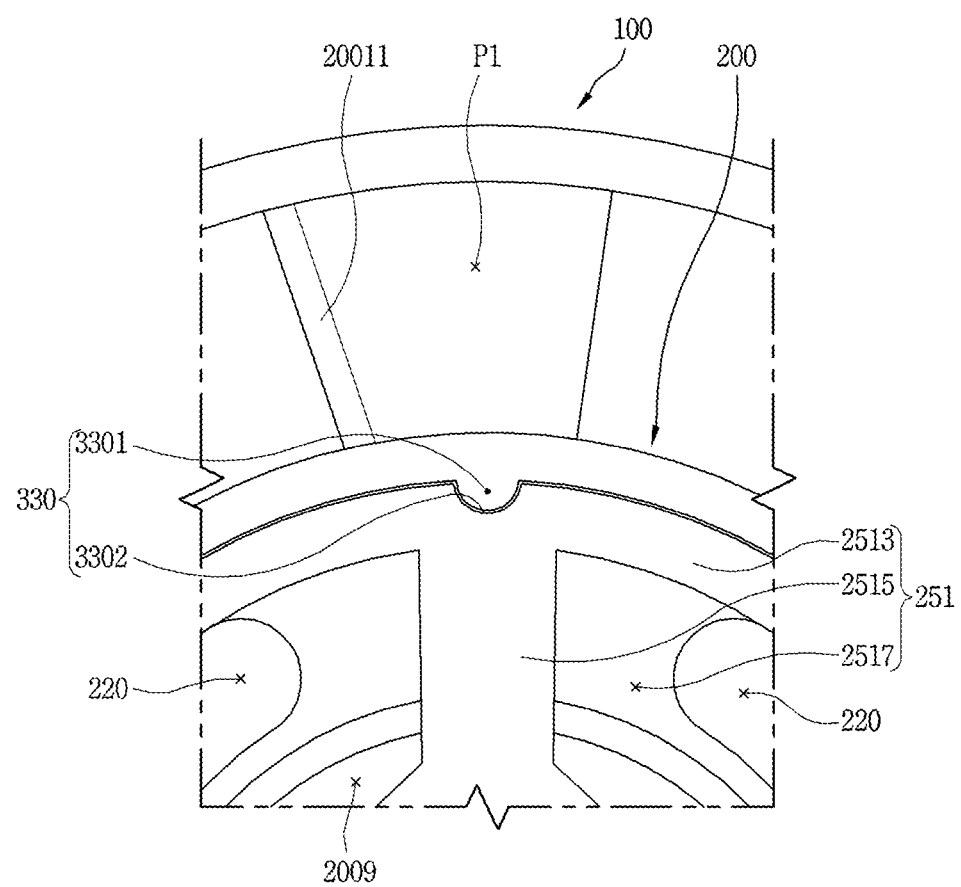
FIG. 11 is an enlarged view of an example part of FIG. 10.

FIG. 9 is a view for explaining an example of coupling between the inner housing and the stator core of FIG. 2, FIG. 10 illustrates an example of a coupled state of FIG. 9, viewed from one side, and FIG. 11 is an enlarged view of an example part of FIG. 10. As illustrated in FIGS. 9 and 10, when coupling the inner housing 200 and the stator core 251 together, the stator core 251 is disposed at an opening of the inner housing 200 so that the coupling recess 3302 of the stator core 251 corresponds to the coupling protrusion 3301 of the inner housing 200.

Next, when the stator core 251 is inserted into the inner housing 200 in the axial direction, as illustrated in FIG. 11, the stator core 251 is relatively moved in the axial direction to be coupled to the inner housing 200 in a state that the coupling protrusion 3301 is inserted into the coupling recess 3302.

Once the stator core 251 is coupled to the inside of the inner housing 200, as illustrated in FIG. 10, each of the axial through sections 220 is disposed between two adjacent teeth 2515 in the circumferential direction, that is, the axial through sections 220 are disposed to correspond to the respective slots 2517.

In some implementations, three axial through sections 220 can be provided to correspond to the three slots 2517.

The axial through sections 220 can each have, for example, an arcuate shape.

Each of the axial penetration sections 220 includes, for example, an inner surface portion 2201 and an outer surface portion 2202 that are disposed concentrically with each other, and connecting portions 2203 connecting both sides of the inner surface portion 2201 and the outer surface portion 2202.

The inner surface portion 2201 can be configured as a circular arc having a constant radius from a center of the inner housing 200.

The outer surface portion 2202 can be configured as a circular arc having a constant radius from the center of the inner housing 200 at an outer side of the inner surface portion 2201.

The connecting portions 2203 of the axial through section 220 can each have, for example, an arcuate shape.

Each of the connecting portions 2203 can have an arcuate shape that is outwardly convex along the circumferential direction.

Figure 12:
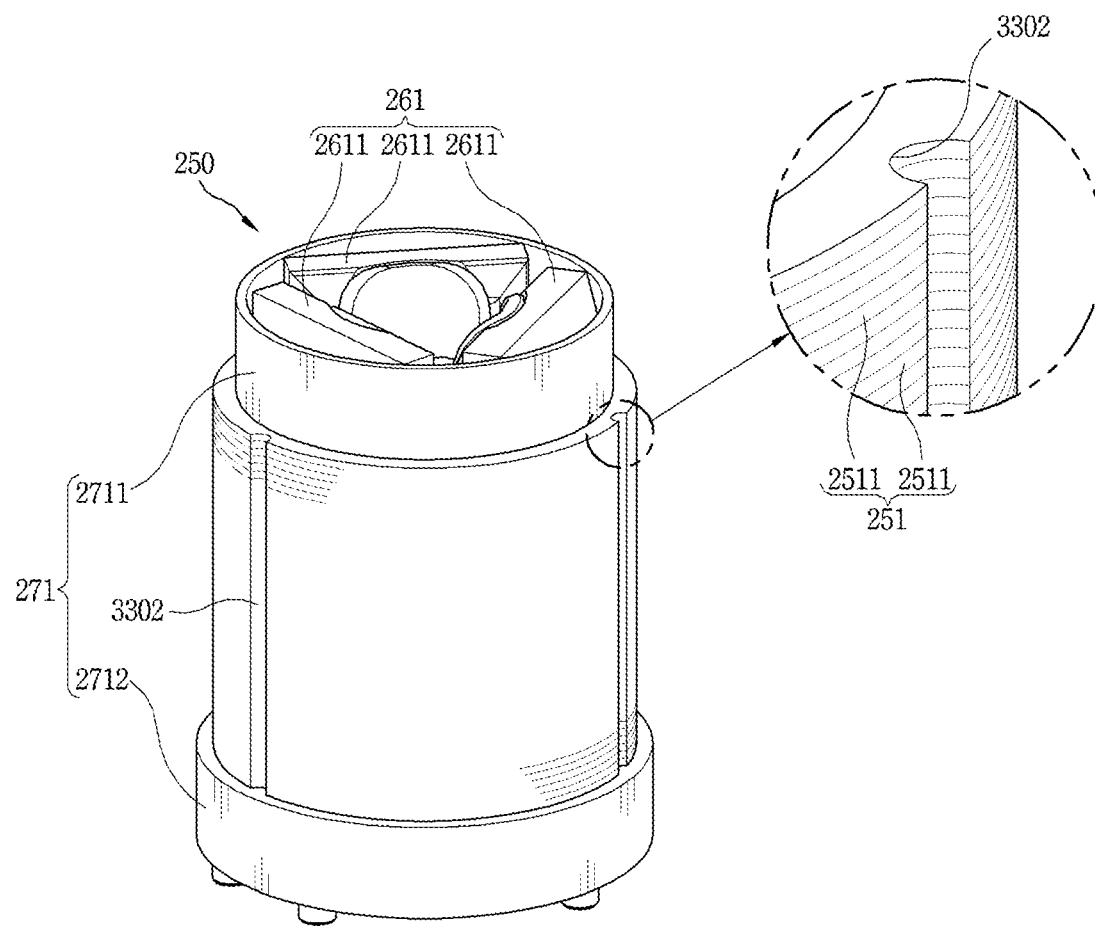
FIG. 12 is a perspective view of a stator of FIG. 2.
Figure 13:
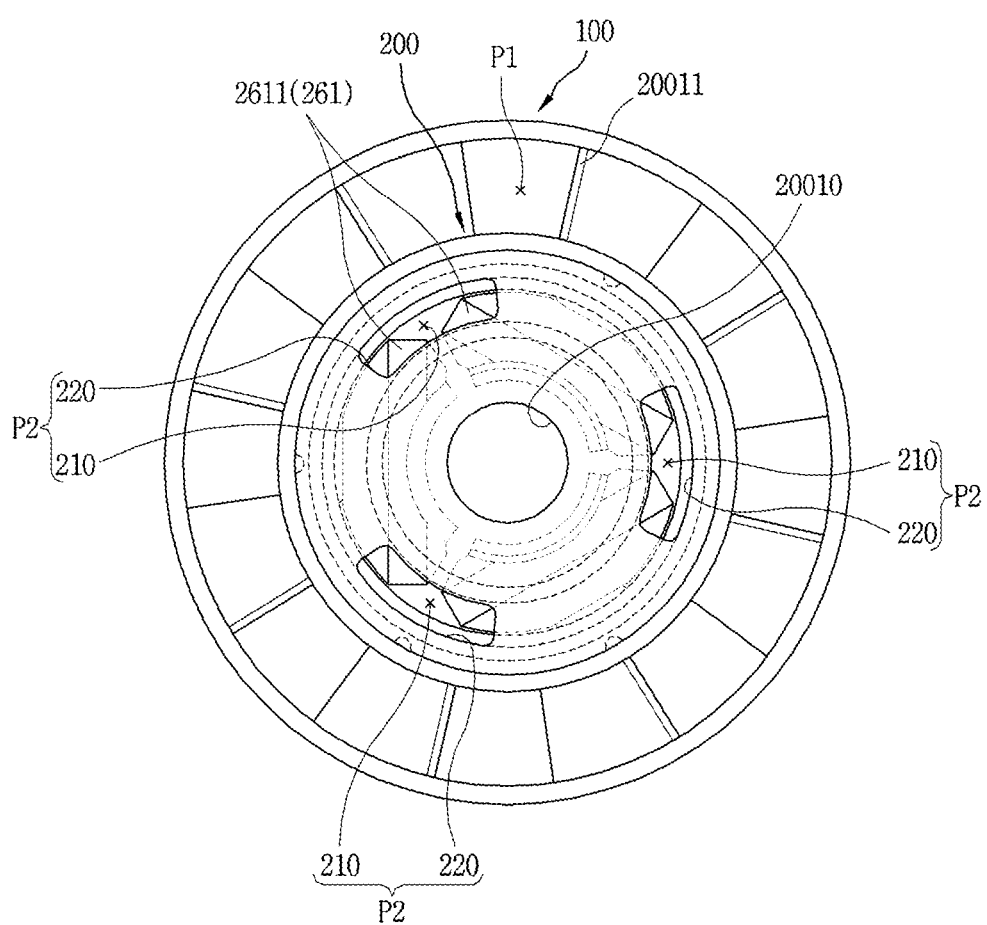
FIG. 13 illustrates a coupled state between the inner housing and the stator of FIG. 2 viewed from one side.

FIG. 12 is a perspective view of the stator of FIG. 2, and FIG. 13 illustrates an example of a coupled state between the inner housing and the stator of FIG. 2, viewed from one side. As illustrated in FIG. 12, the stator 250 can include a stator core 251, a stator coil 261 wound around the stator core 251, and an insulator 271 for insulating the stator core 251 and the stator coil 261.

The insulator 271 is made of, for example, an electrical insulating material (e.g., a synthetic resin member).

The insulator 271 can be molded, for example during manufacturing, by filling an electrical insulating material into a mold with the stator core 251 inserted into the mold.

In some implementations, the insulator 271 can include a first insulator 2711 protruding from one end portion of the stator core 251 in the axial direction and a second insulator 2712 protruding from another end portion of the stator core 251 in the axial direction. For example, the first insulator 2711 can have a reduced outer diameter relative to an outer diameter of the stator core 251. The second insulator 2712 can have an increased outer diameter relative to the outer diameter of the stator core 251.

In some examples, the first insulator 2711 can be inserted into the inner housing 200. For instance, the first insulator 2711 can be disposed at the insulator accommodating section 20052 inside the inner housing 200. In some examples, the second insulator 2712 can be disposed at an outside of the inner housing 200. For instance, the second insulator 2712 can be in contact with an end portion of the inner housing 200.

The first insulator 2711 and the second insulator 2712 can be configured to surround an inner surface portion of the yoke 2513 and a peripheral surface (both side (or lateral) surfaces, upper and lower surfaces in the drawing) of each of the plurality of teeth 2515.

In addition, the first insulator 2711 and the second insulator 2712 can protrude in the axial direction to insulate an end turn of the stator coil 261.

The stator coil 261 can be provided with a plurality of phase coils 2611 intensively wound around the plurality of teeth 2515, for example.

The plurality of phase coils 2611 are respectively connected to phases (U phase, V phase, and W phase) of a three-phase AC power supply, for example.

The second air flow path P2 includes a stator inner section 210 that passes through an inside of the stator 250.

The stator inner section 210 can include, for example, an air gap G defined between the stator 250 and the rotor 300.

The stator inner section 210 can include, for example, a space (an empty space in the slot 2517) defined between the stator core 251 and the stator coil 261.

With this configuration, when the stator 250 is insertedly coupled to the inside of the inner housing 200, as illustrated in FIG. 13, the axial through section 220 can be disposed between end portions of two adjacent phase coils 2611 by the coupling protrusion 3301 of the inner housing 200 and the coupling recess 3302 of the stator core 251, for example.

In some examples, the axial through sections 220 defining the second air flow paths P2 can have, for example, cross-sectional areas smaller than cross-sectional areas of the plurality of phase coils 2611.

The cross-sectional area of the axial through section 220 can be, for example, 0.75 to 0.80 of the cross-sectional area of each of the phase coils 2611.

More specifically, in some implementations, when the cross-sectional area of each of the plurality of phase coils 2611 is 12.7 mm2, the cross-sectional area of the axial through section 220 can be 9.85 mm2, which is 0.775 of the cross-sectional area of the each of the plurality of phase coils 2611.

With this configuration, when the impeller 150 rotates, air flowing along the second air flow path P2 inside the inner housing 200 can be stably moved at a preset speed.

Figure 14:
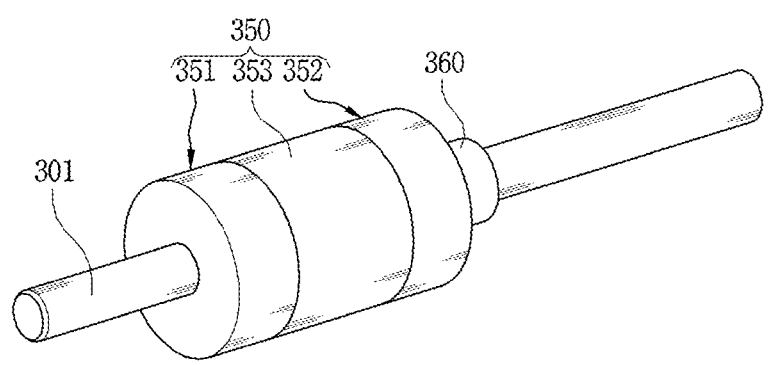
FIG. 14 is a perspective view of a bearing assembly FIG. 2.
Figure 15:
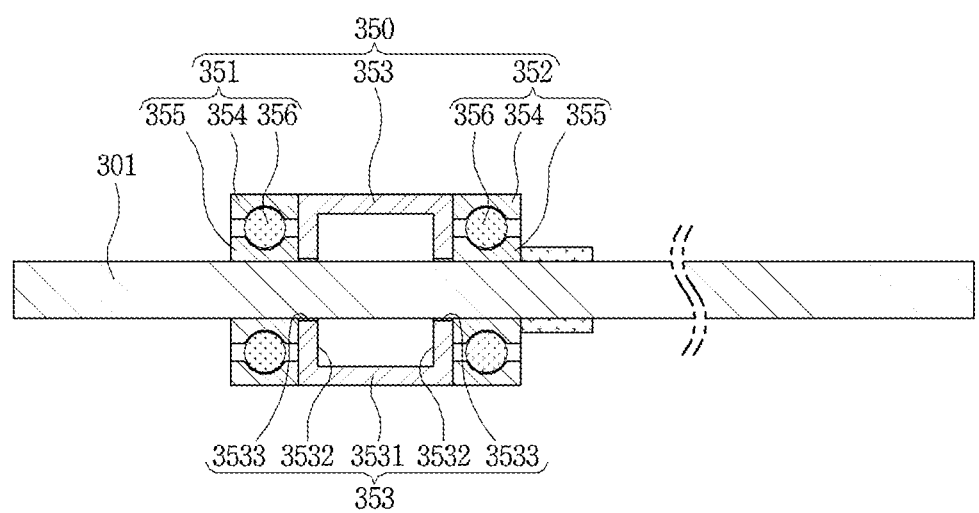
FIG. 15 is a cross-sectional view of FIG. 14.

FIG. 14 is a perspective view of an example of the bearing assembly of FIG. 2, and FIG. 15 is a cross-sectional view of the bearing assembly of FIG. 14. As illustrated in FIGS. 14 and 15, the bearing assembly 350 includes a first bearing 351 and a second bearing 352 that are spaced apart from each other in the axial direction.

The first bearing 351 can be implemented as a ball bearing including an outer ring 354, an inner ring 355 disposed concentrically in the outer ring 354, and a plurality of balls 356 provided between the outer ring 354 and the inner ring 355.

The second bearing 352 can be implemented as a ball bearing including an outer ring 354, an inner ring 355 disposed concentrically in the outer ring 354, and a plurality of balls 356 provided between the outer ring 354 and the inner ring 355.

The bearing assembly 350 includes a spacer 353 that is inserted between the first bearing 351 and the second bearing 352.

The spacer 353 can have, for example, a cylindrical shape.

More specifically, the spacer 353 can include a cylindrical portion 3531 and side portions 3532 defined on both sides of the cylindrical portion 3531. A rotating shaft hole 3533 in which the rotating shaft 301 is accommodated can be defined through the both side surface portions 3522.

One end portion of the spacer 353 can be in contact with the first bearing 351 and another end portion of the second bearing 352 can be in contact with the second bearing 352.

Accordingly, the first bearing 351 and the second bearing 352 can be securely spaced apart from each other by a preset distance.

A fixing member 360 for fixing the bearing assembly 350 against the axial direction can be provided at one side of the bearing assembly 350.

The fixing member 360 can be fixedly coupled to the rotating shaft 301.

This can prevent the bearing assembly 350 from being moved toward the fixing member 360 in the axial direction. More specifically, the spacer 252 can prevent the first bearing 351 and the second bearing 352 from moving toward each other.

The first bearing 351 is accommodated in the bearing assembly accommodating portion 2009, which can prevent the first bearing 351 from being moved in a direction away from the second bearing 352, and the second bearing 352 can be suppressed form being moved in a direction away from the first bearing 351 by the fixing member 360.

Hereinafter, a structure of the axial through section 220 of the electric motor assembly will be described with reference to FIGS. 16 to 19.

Figure 16:
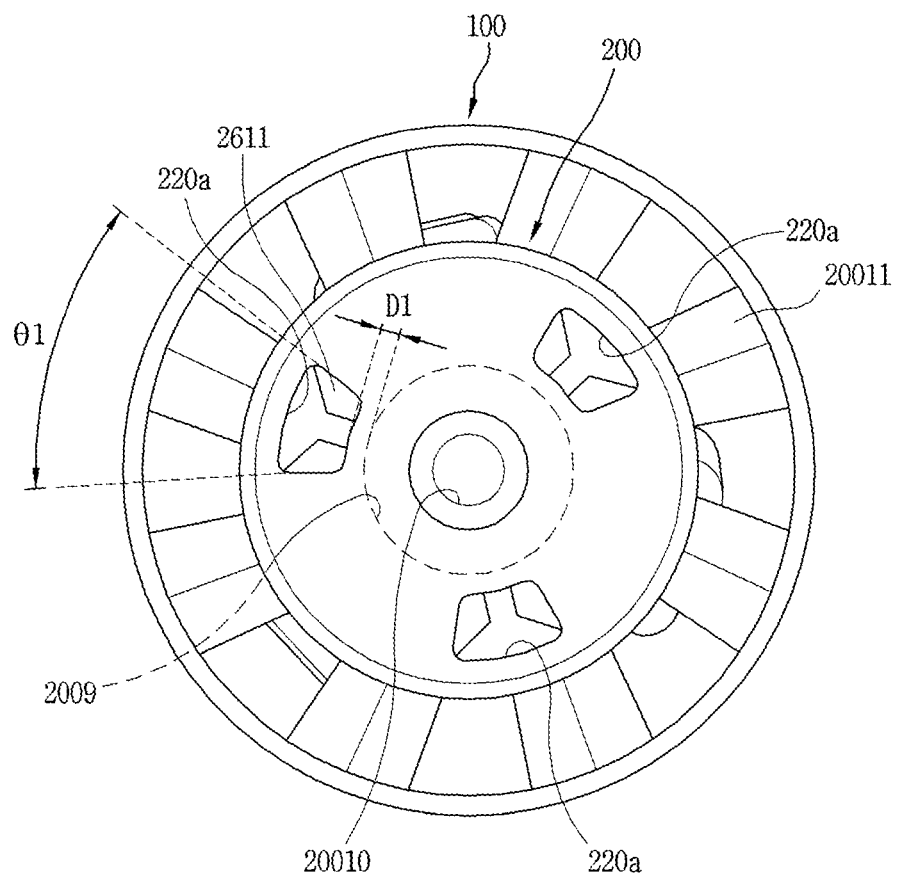
FIGS. 16 to 18 are views respectively illustrating an example of an axial through section of an example of an electric motor assembly, viewed from one side.
Figure 17:
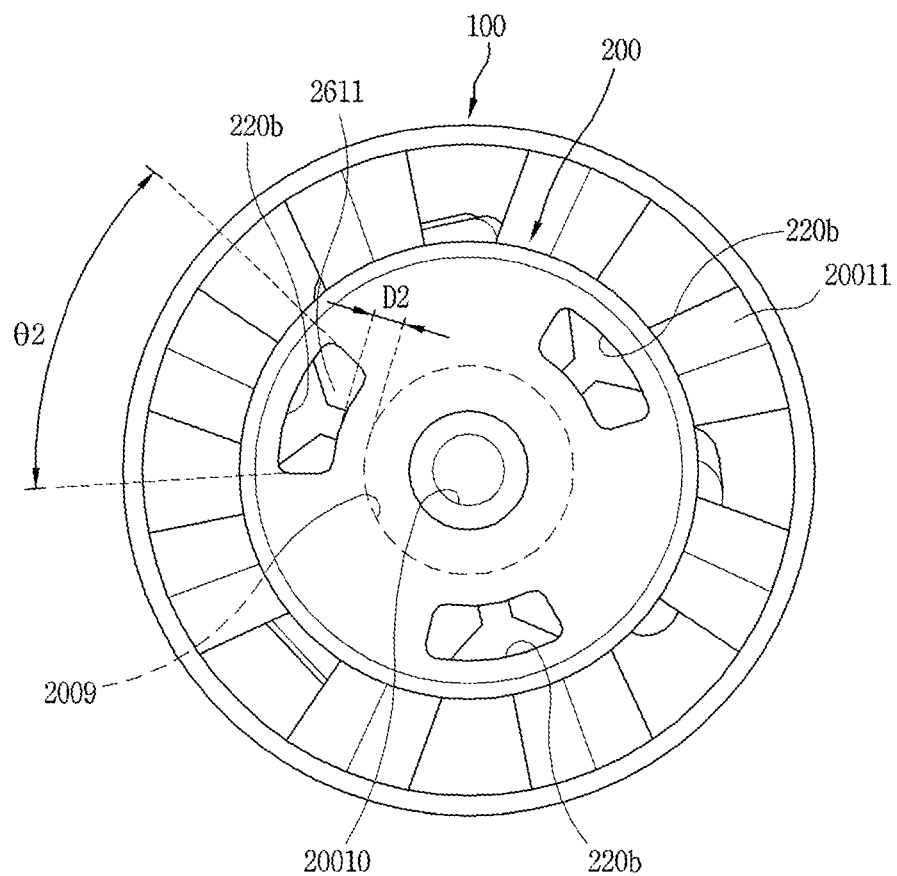
Figure 18:
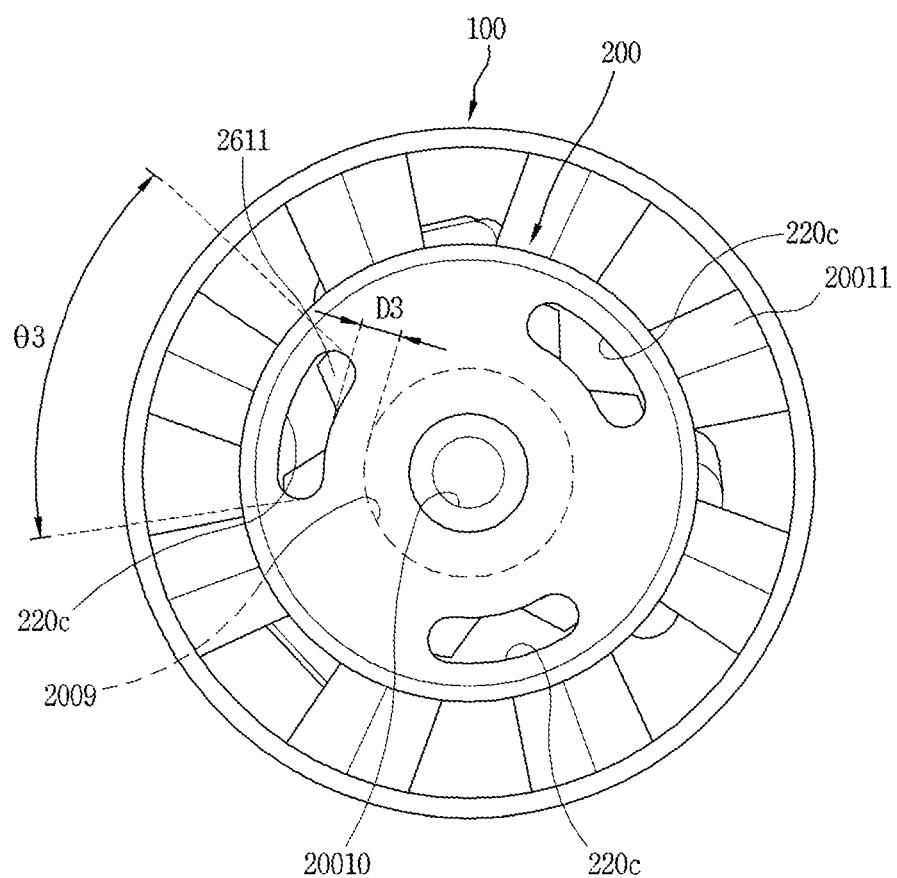
Figure 19:
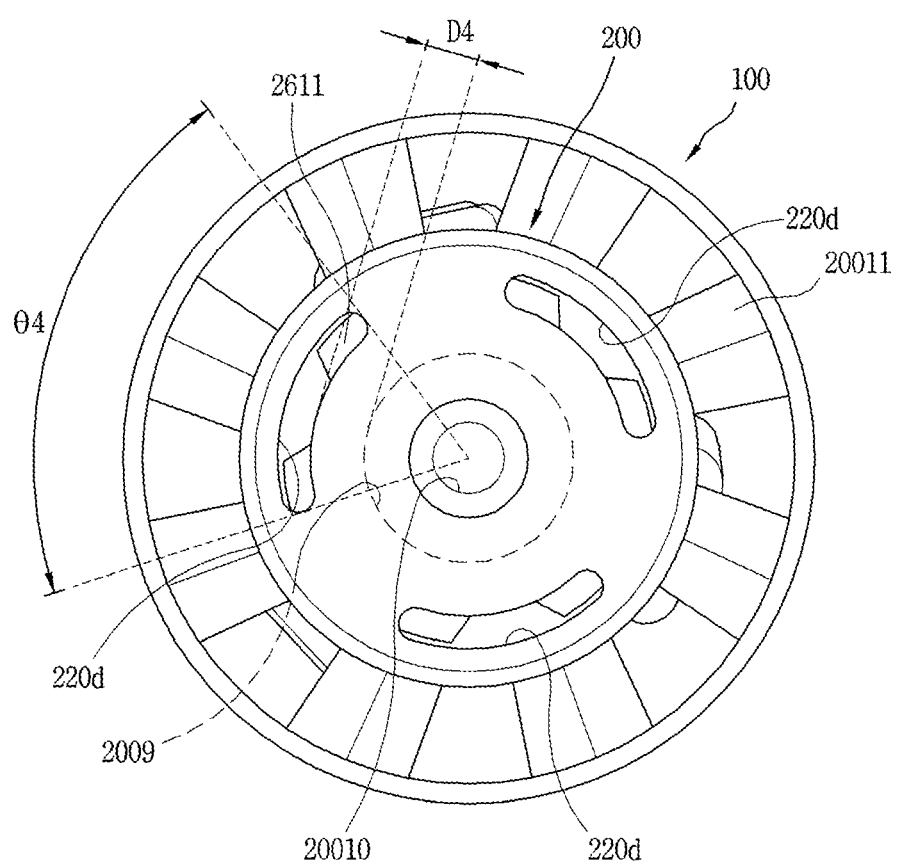
FIG. 19 is a view illustrating a comparative example corresponding to the axial through section.

FIGS. 16 to 18 are views respectively illustrating an example of an axial through section of an example of an electric motor assembly, viewed from one side, and FIG. 19 is a view illustrating a comparative example corresponding to the axial through section.

As described above, the inner housing 200 is provided with a second air flow path P2 through which air flows via the inside of the inner housing 200 when the impeller 150 rotates.

As illustrated in FIG. 16, the second air flow path P2 includes an axial through section 220a defined axially through the inner housing 200 at an outer side of the bearing assembly 350 in the radial direction of the inner housing 200.

The axial through section 220a can have, for example, a cross-sectional area corresponding to 0.75 to 0.80 (e.g., 0.775) of a cross-sectional area of the phase coil 2611 of the stator coil 261.

The axial through section 220a is spaced apart from the bearing assembly accommodating portion 2009 in the radial direction of the inner housing 200 by a preset distance.

In some examples, the preset distance between the axial through section 220a and the bearing assembly accommodating portion 2009 can be, for example, greater than or equal to 0.5 mm and less than 2.0 mm.

In some implementations, the axial through section 220a can be spaced apart from the bearing assembly accommodating portion 2009 in the radial direction by a first distance D1. The first distance D1 can be, for example, 0.5 mm.

That is, the axial through section 220a can have an inner surface portion having an arcuate shape with the first distance D1 of a 0.5 mm from the bearing assembly accommodating portion 2009.

An outer surface portion of the axial penetration section 220 can have, for example, an arcuate shape corresponding to an inner circumferential surface of the slot 2517 of the stator core 251.

In some examples, as the cross-sectional area of the axial through section 220 is defined in the range of 0.75 to 0.80 (e.g., 0.775) of the cross-sectional area of the phase coil 2611 of the stator coil 261, both side surfaces of the axial through section 220a can form a preset first internal angle θ1.

In some examples, as illustrated in FIG. 17, an axial through section 220b can be spaced apart from the bearing assembly accommodating portion 2009 in the radial direction by a second distance D2.

The second distance D2 can be 1.0 mm, for example.

An inner surface portion of the axial through section 220b is defined as a circular arc defining the second distance D2 of a 1.0 mm from the bearing assembly accommodating portion 2009, and an outer surface portion of the axial through section 220b, as described above, can be configured as a circular arc corresponding to an inner diameter of the slot 2517 of the stator core 251.

As the cross-sectional area of the axial through section 220b corresponds to 0.75 to 0.80 (e.g., 0.775) of the cross-sectional area of the phase coil 2611 of the stator coil 261, both side surfaces of the axial through section 220b can extend in the circumferential direction to have a second internal angle θ2.

In some examples, as the axial through section 220b of this implementation is relatively far apart from the bearing assembly accommodating portion 2009 compared to the axial through section 220a illustrated in FIG. 16, the axial through section 220b can be reduced in the radial direction and increased in the circumferential direction.

In addition, as illustrated in FIG. 18, an axial through section 220c can be radially spaced apart from the bearing assembly accommodating portion 2009 by a third distance D3. The third distance D3 can be, for example, 1.5 mm.

At this time, an inner surface portion of the axial through section 220c is defined as a circular arc having the third distance D3 of 1.5 mm from the bearing assembly accommodating portion 2009, and an outer surface portion of the axial through section 220, as described above, is defined as a circular arc corresponding to the inner diameter of the slot 2517 of the stator core 251.

When the axial through section 220c has the same cross-sectional area, both side surfaces of the axial through section 220c extend in the circumferential direction to form a third internal angle θ3.

In some examples, since the axial through section 220c of this implementation is further spaced apart from the bearing assembly 350 compared to those of the implementations described above, both side surfaces of the axial through section 220c form a third internal angle θ3 greater than the second internal angle θ2.

In some examples, as illustrated in FIG. 19, an axial through section 220d of the comparative example can be spaced apart from the bearing assembly 350 in the radial direction by a fourth distance D4. In some examples, the fourth distance D4 can be, for example, 2.0 mm.

In some examples, a cross-sectional area of the axial through section 220d corresponds to 0.75 to 0.80 (e.g., 0.775) of the cross-sectional area of the phase coil 2611 of the stator coil 261 the same as the implementations described above.

As the axial through section 220d is further spaced apart from the bearing assembly accommodating portion 2009 compared to those of the implementations described above, both side surfaces of the axial through section 220d form a fourth internal angle θ4 greater than the third internal angle θ3.

Accordingly, internal flow velocity of the slot 2517 of the stator core 251 of the second air flow path P2 when the impeller 150 rotates is shown in the Table 1 below.

TABLE 1

| Distance between axial through section and bearing assembly accommodating portion (mm) | Cross-sectional area of phase coil (mm²) | Cross-sectional area of axial through section (mm²) | Flow velocity in slot (m/s) |
|---|---|---|---|
| 0.5 | 12.7 | 9.85 | 7.5 |
| 1.0 | 12.7 | 9.85 | 8.1 |
| 1.5 | 12.7 | 9.85 | 7.2 |
| 2.0 | 12.7 | 9.85 | 6.9 |

As described with reference to FIGS. 16 to 19, the axial through sections 220a, 220b, 220c, and 220d of the inner housing 200 have the same cross-sectional area corresponding to 0.775 of the cross-sectional area of the phase coil 2611 of the stator coil 261, and internal flow velocity in the slot 2517 of the stator core 251 of the slot 2517 varies according to a distance between the axial through section 220 and the bearing assembly accommodating portion 2009 in the radial direction, namely, the first distance D1, the second distance D2, the third distance D3, and the fourth distance D4.

More specifically, when the distance between the axial through section (220a, 220b, 220c, 220d) and the bearing assembly accommodating portion 2009 is 1.0 mm, which is the second distance D2, the flow velocity in the slot 2517 of the stator core 251 is 8.1 m/s, which is the fastest internal flow velocity. When the distance between the axial through section (220a, 220b, 220c, 220d) and the bearing assembly accommodating portion 2009 is the first distance D1 of 0.5 mm, the flow velocity in the slot 2517 of the stator core 251 is slightly reduced to 7.5 m/s.

When the distance between the axial through section (220a, 220b, 220c, 220d) and the bearing assembly accommodating portion 2009 is 1.5 mm, which is the third distance D3, the flow rate is further reduced to 7.2 m/s. When the distance between the axial through section (220a, 220b, 220c, 220d) and the bearing assembly accommodating portion 2009 exceeds the third distance D3 of 1.5 mm, the flow velocity in the slot 2517 of the stator core 251 was gradually decreased. When the distance between the axial through section (220a, 220b, 220c, 220d) and the bearing assembly accommodating portion 2009 is 2.0 mm, which is the fourth distance D4, the flow velocity in the slot 2517 of the stator core 251 was found to be 6.9 m/s.

Hereinafter, how the electric motor assembly works will be described with reference to FIG. 20.

With this configuration, when operation is started and power is applied to the stator coil 261, a magnetic field produced by the stator coil 261 and a magnetic field produced by the permanent magnet 305 interact with each other, causing the rotor 300 to rotate around the rotating shaft 301.

Figure 20:
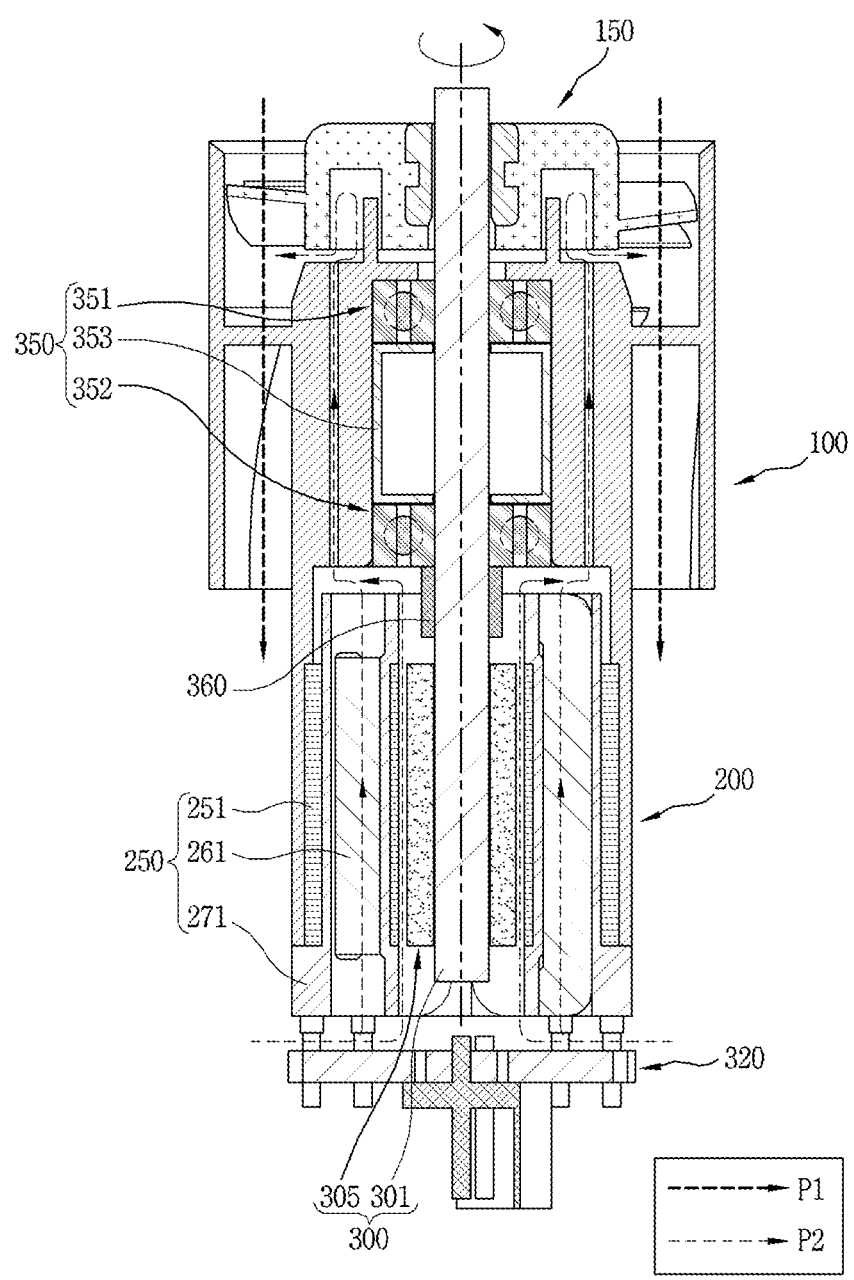
FIG. 20 is a cross-sectional view for explaining operation of the electric motor assembly of FIG. 2.

The impeller 150 rotates simultaneously as the rotating shaft 301 rotates, and when the impeller 150 rotates, as illustrated in FIG. 20, air flows between the inner housing 200 and the outer housing 110 along the first air flow path P1, and air flows along the second air flow path P2 passing through the inside of the inner housing 200 as well.

More specifically, when the impeller 150 is driven, air at the front (upper side in the drawing) of the impeller 150 is suctioned into the outer housing 110 and is discharged to the rear (lower side in the drawing) of the outer housing 110 along the axial direction via the impeller 150. Air discharged from a lower end of the outer housing 110 can flow along the outer surface of the inner housing 200.

When the impeller 150 rotates, pressure (negative pressure) that is lower than atmospheric pressure is defined in an area between the impeller 150 and the inner housing 200 as the plurality of blades 155 rotate, and an inner space of the inner housing 200 communicates with the area between the impeller 150 and the inner housing 200 by the axial through section 220.

Accordingly, air inside the inner housing 200 passes through the axial through section 220 by a pressure difference and flows into the space between the impeller 150 and the inner housing 200.

In some examples, the air that has passed through the axial through section 220 flows into the cavity 1513, and a flow direction is changed while moving along an inner surface of the cavity 153. Then, the air flows outward in a radial direction of the impeller 150, joins with air of the first air flow path P1, and is then discharged in the axial direction.

As air in the inner housing 200 is discharged through the axial through section 220, pressure in the inner housing 200 is reduced and air at the outside of the inner housing 200 is introduced into the inner housing 200 through the lower opening of the inner housing 200.

The air introduced into the inner housing 200 flows to the axial through section 220 through the stator inner section 210, namely, the air gap G between the stator core 251 and the rotor 300, and an empty space between the phase coils 2611 of the stator coil 261 in the slot 2617 of the stator core 251.

Accordingly, cooling of the stator 250 and the rotor 300 is facilitated, and in particular, cooling of the phase coils 2611 of the stator coil 261 in which heat is generated during operation due to electrical resistance heat can be significantly facilitated.

Further, cooling of the PCB 320 can be facilitated by air introduced through the lower opening of the inner housing 200.

Hereinafter, another example of the present disclosure will be described with reference to FIGS. 21 to 25.

Figure 21:
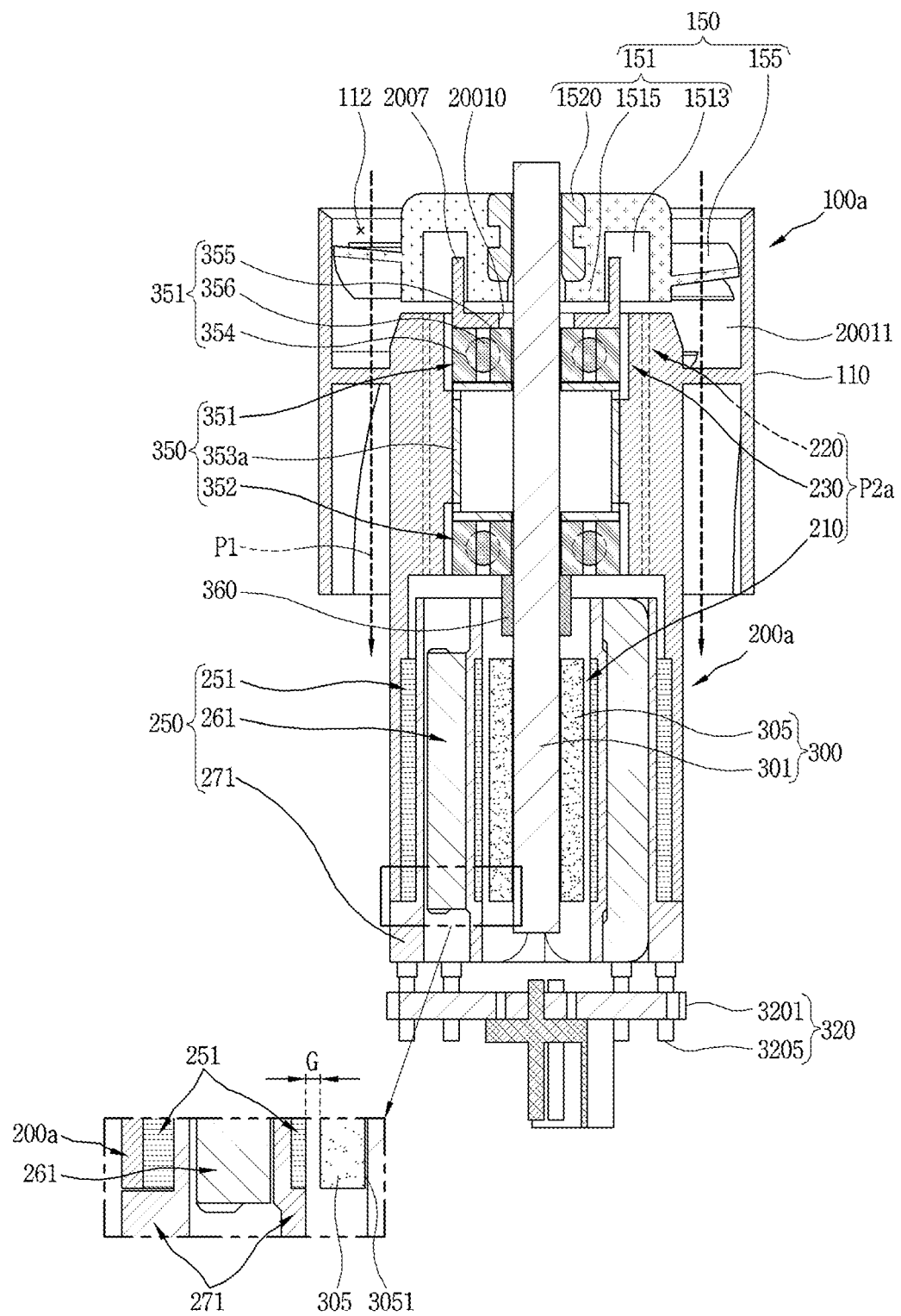
FIG. 21 is a cross-sectional view of an example of an electric motor assembly.
Figure 22:
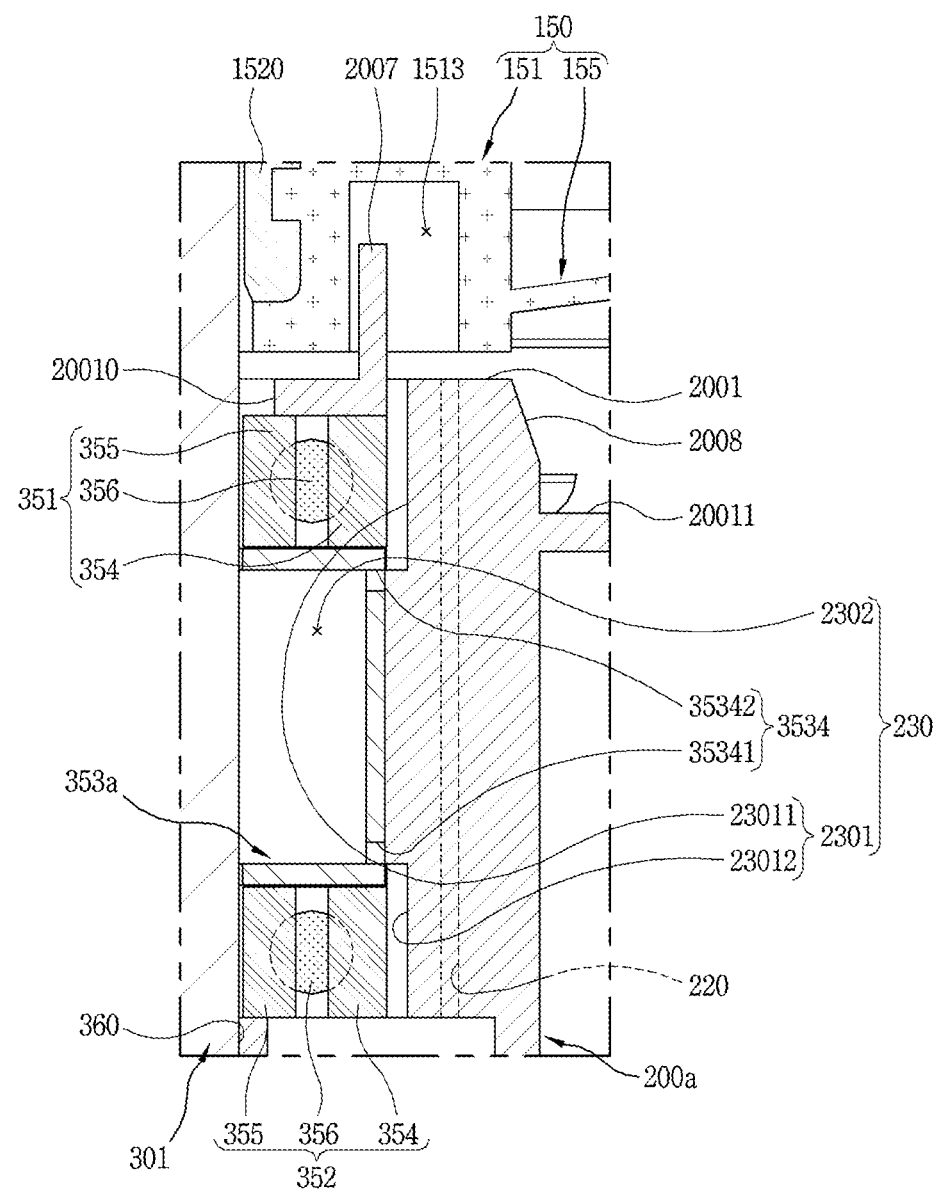
FIG. 22 is an enlarged view of an example part of FIG. 21.
Figure 23:
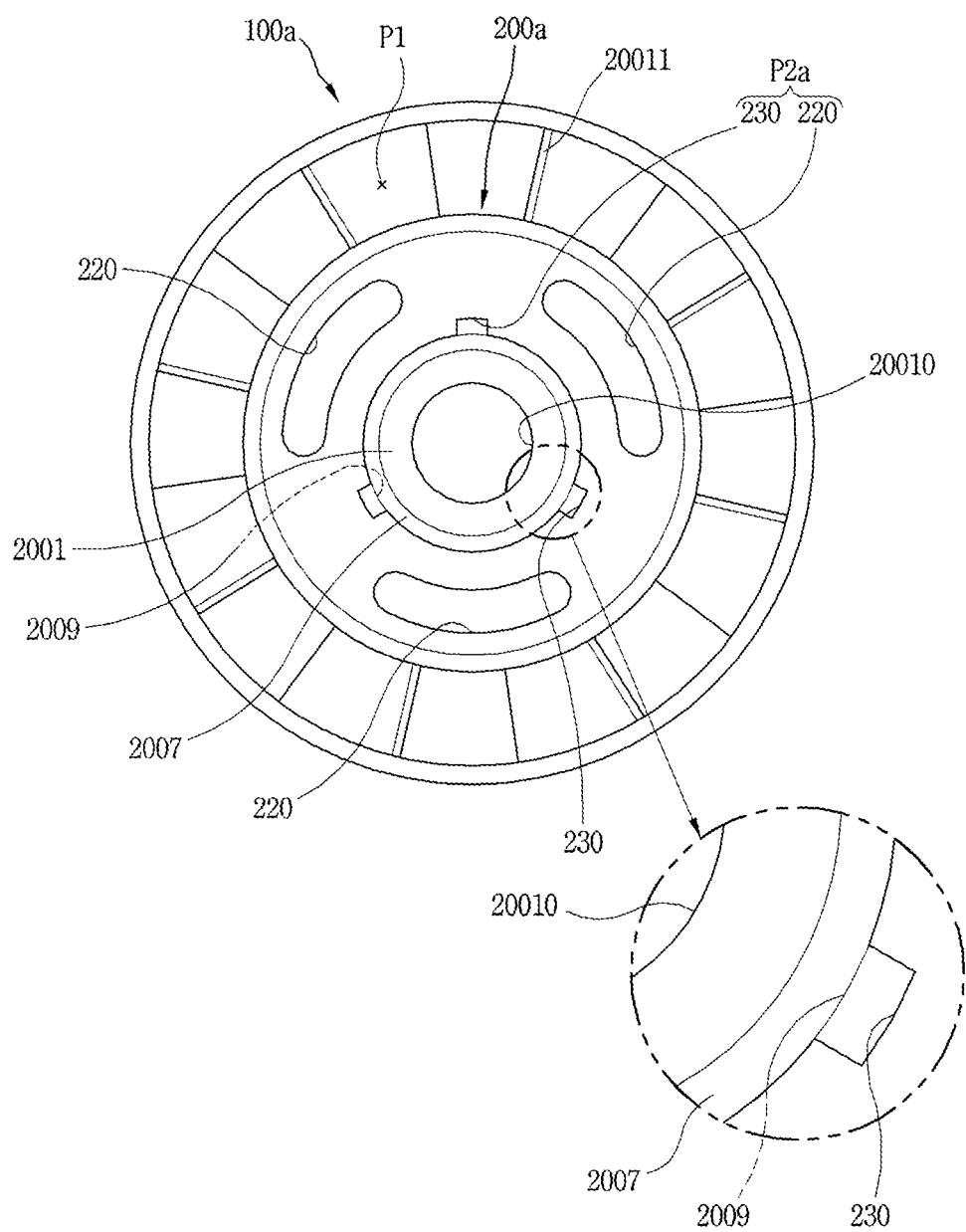
FIG. 23 is a view illustrating examples of an outer housing and an inner housing of FIG. 21, viewed from one side in an axial direction.
Figure 24:
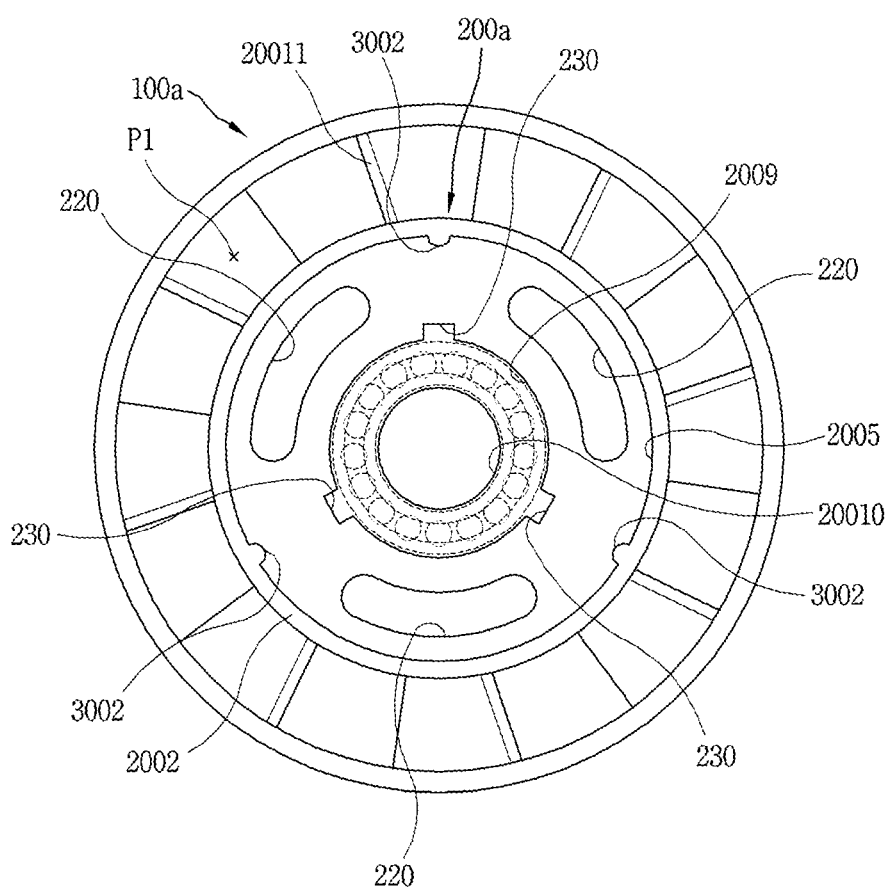
FIG. 24 is a view illustrating the outer housing and the inner housing of FIG. 21, viewed from another side in the axial direction.
Figure 25:
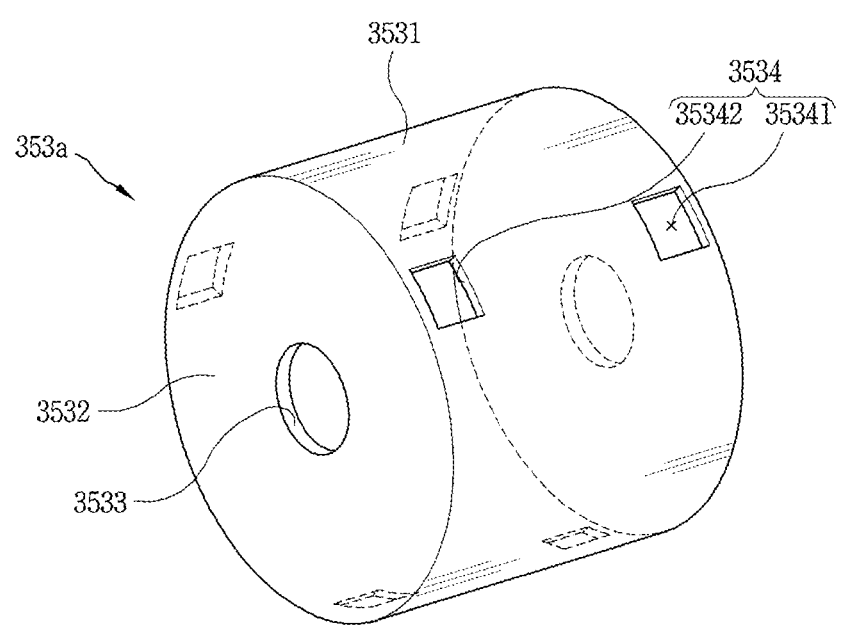
FIG. 25 is a perspective view of an example of a spacer of FIG. 21.
Figure 26:
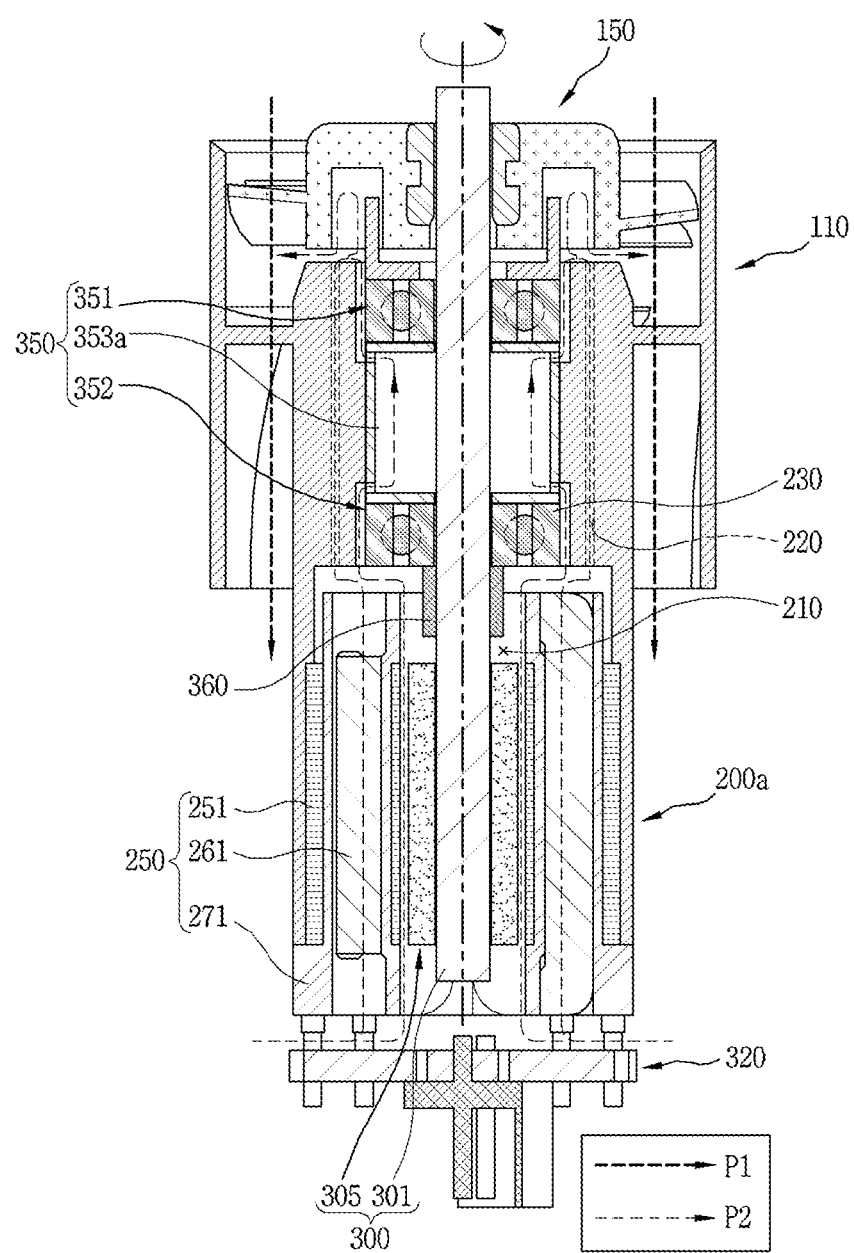
FIG. 26 is a view illustrating an example of operation of the electric motor assembly of FIG. 21.

FIG. 21 is a cross-sectional view of an example of an electric motor assembly, FIG. 22 is an enlarged view of a main part of FIG. 21, FIG. 23 is a view illustrating an outer housing and an inner housing of FIG. 21, viewed from one side in an axial direction, FIG. 24 is a view illustrating the outer housing and the inner housing of FIG. 21 viewed from another side in the axial direction, FIG. 25 is a perspective view of a spacer of FIG. 21, and FIG. 26 is a view illustrating operation of the electric motor assembly of FIG. 21. As illustrated in FIGS. 21 and 22, an electric motor assembly 100a of this implementation includes an outer housing 110, an impeller 150, an inner housing 200a, a stator 250, and a rotor 300.

The outer housing 110 has a cylindrical shape with both sides open.

The impeller 150 is rotatably accommodated in one side of the outer housing 110.

The impeller 150 includes a hub 151 and a plurality of blades 155 disposed around the hub 151.

The impeller 150 is provided with a cavity 1513 that is recessed into a surface facing the inner housing 200 in the axial direction and extends in the circumferential direction, for example.

A boss 1515 of the impeller 150 is accommodated in the blocking rib 2007.

Accordingly, a gap between the impeller 150 and the inner housing 200a can be blocked.

The blocking rib 2007 protruding from the inner housing 200a in the axial direction and extending in the circumferential direction is accommodated in the cavity 1513.

The inner housing 200a is accommodated at one side of the impeller 150 inside the outer housing 110.

The inner housing 200a has a cylindrical shape with one side open.

The inner housing 200a includes, for example, a protruding section 2003 protruding outward from one end portion of the outer housing 110 in the axial direction.

The stator 250 is accommodated in the inner housing 200a.

The protruding section 2003 is provided therein with a stator accommodating portion 2005 in which the stator 250 is accommodated.

The inner housing 200a is provided therein with a bearing assembly accommodating portion 2009 in which a bearing assembly 350a is accommodated.

The bearing assembly 350a is disposed between the impeller 150 and the rotor 300 along the axial direction to rotatably support the impeller 150 and the rotor 300, for example.

The bearing assembly 350a includes, for example, a first bearing 351 and a second bearing 352 that are spaced apart from each other along the axial direction, and a spacer 353a disposed between the first bearing 351 and the second bearing 352.

The first bearing 351 and the second bearing 352 respectively include an outer ring 354, an inner ring 355, and a plurality of balls 356 provided between the outer ring 354 and the inner ring 355.

The spacer 353a includes, for example, a cylindrical portion 3531 and side portions 3532.

A rotating shaft hole 3533 in which the rotating shaft 301 is received can be defined through the both side portions 3532, for example.

A through part 3534 can be defined through the cylindrical portion 3531 so that the inside and the outside of the cylindrical portion 3531 can communicate with each other. The through part 353a4 includes, for example, a lower through portion 353a41 and an upper through portion 353a42 that are respectively defined through both end portions (the rotor-side end portion (lower end portion) and the impeller-side end portion (upper end portion) in the drawing).

The stator 250 included a stator core 251 and a stator coil 261 wound around the stator core 251.

The stator coil 261 includes, for example, a plurality of phase coils 2611 connected to a three-phase AC power supply.

The plurality of phase coils 2611 are electrically connected to phases (U-phase, V-phase, and W-phase) of the three-phase AC power supply, for example.

The stator core 251 includes three teeth 2515 and three slots 2517.

The plurality of phase coils 2611 can be three in number, for example.

The rotor 300 is rotatably disposed in the stator 250 with a predetermined gap G therebetween.

The rotor 300 includes, for example, a rotating shaft 301 and a permanent magnet 305 coupled to a circumference of the rotating shaft 301.

A PCB 320 that is electrically connected to the stator coil 261 is provided at one side (lower side in the drawing) of the stator 250.

When the impeller 150 rotates, a first air flow path P1 through which air moves along the axial direction is defined between the outer housing 110 and the inner housing 200a.

When the impeller 150 rotates, a second air flow path P2a is defined inside the inner housing 200a.

When the impeller 150 is rotationally driven, the second air flow path P2a is configured such that air is introduced from a lower opening of the inner housing 200a, passes through an inside of the inner housing 200a, then joins or merges with the air of the first air flow path P1 via the gap between the impeller 150 and the inner housing 200a.

The second air flow path P2a includes, for example, a stator inner section 210 that passes through the inside of the stator 250.

The stator inner section 210 includes an air gap G between the stator 250 and the rotor 300, and an empty space of an inner space of the slot 2517 of the stator core 251 except the phase coils 2611 of the stator coil 261.

The second air flow path P2a includes, for example, an axial through section 220 defined axially through the inner housing 200a at an outside of the bearing assembly 350a in a radial direction of the inner housing 200a.

The axial through section 220 is axially defined through the inner housing 200a at a position corresponding to the slot 2517 of the stator 250.

Three axial through sections 220 are provided to correspond to the number of slots 2517.

The axial through section 220 is configured to have a cross-sectional area smaller than a cross-sectional area of the phase coil 2611 of the stator coil 261.

The axial through section 220 can have a cross-sectional area corresponding to 0.75 to 0.80 of the cross-sectional area of the phase coil 2611, for example.

The axial through section 220 is spaced apart from the bearing assembly accommodating portion 2009 by a preset distance along the radial direction of the inner housing 200a.

The axial through section 220 can be spaced apart from the bearing assembly accommodating portion 2009 in the radial direction of the inner housing 200a by 0.5 mm to 1.5 mm.

In some examples, In some implementations, the second air flow path P2a is provided with a bearing assembly cooling section 230 defined at an outside of the bearing assembly 350a in the radial direction of the inner housing 200a.

Accordingly, cooling of the bearing assembly 350a can be facilitated.

In addition, cooling of the inner housing 200a can be enhanced, which allows a temperature of the inner housing 200a to be maintained at a relatively low temperature.

As a result, heat exchange between the inner housing 200a, the stator 250 and the rotor 300, which are provided in the inner housing 200a, can be further facilitated to thereby more effectively cool the stator 250 and the rotor 300.

The bearing assembly cooling section 230, as illustrated in FIG. 23, can be spaced apart from the axial through section 220 along a circumferential direction of the inner housing 200a, for example.

The bearing assembly cooling section 230 can be defined between the two axial through sections 220 disposed adjacent to each other along the circumferential direction, for example.

The bearing assembly cooling section 230 can be, for example, three in number.

The bearing assembly cooling section 230 can be expanded by cutting a portion of the inner surface of the bearing assembly accommodating portion 2009, as illustrated in FIG. 24.

Accordingly, the outer ring 354 of the bearing assembly 350a that is inserted into the bearing assembly accommodating portion 2009 can be in direct contact with flowing air.

As a result, cooling of the bearing assembly 350a can be significantly facilitated.

With this configuration, the bearing assembly 350a can maintain a relatively low temperature during operation, a temperature rise of the bearing assembly 350a is suppressed to thereby prevent forced deterioration caused by thermal expansion.

Thus, service life (or useful life) of the bearing assembly 350a can be extended.

The bearing assembly cooling section 230 can include an outer ring contact section 2301 in contact with the outer ring 354 of the first bearing 351 and the outer ring 354 of the second bearing 352.

As illustrated in FIG. 22, the outer ring contact section 2301 can include a first outer ring contact section 23011 that is in contact with the outer ring 354 of the first bearing 351.

The outer ring contact section 2301 can include a second outer ring contact section 23012 that is in contact with the outer ring 354 of the second bearing 352.

The bearing assembly cooling section 230 can include a spacer contact section 2302 with which air is brought into contact while passing through the spacer 353a.

The spacer contact section 2302 can be configured such that air that has passed through the outer ring contact section 2301 flows into the spacer 353a, and the air that has passed through the spacer 353a flows back to the outer ring contact section 2301.

To this end, as illustrated in FIG. 25, the spacer 353a is provided with through parts 3534 defined through the inside and outside of both end portions in the axial direction.

The through parts 3534 can each include, for example, a lower through portion 35341 defined through one end portion (e.g., the second bearing-side end portion, the lower end portion) of the spacer 353a so as to correspond to the outer ring contact section 2301 defined at an outside of the second bearing 352.

The through parts 3534 can each include, for example, an upper through portion 35342 defined through another end portion of the spacer 353a (e.g., the first bearing-side end portion, the upper end portion) to communicate with the outer ring contact section 2301 defined at an outside of the first bearing 351.

With this configuration, when operation is started and power is applied to the stator coil 261, a magnetic field produced by the stator coil 261 and a magnetic field produced by the permanent magnet 305 interact with each other, causing the rotor 300 to rotate about the rotating shaft 301.

The impeller 150 rotates simultaneously as the rotating shaft 301 rotates, and air at the front of the impeller 150 is suctioned into the outer housing 110, and then flows in the axial direction along the first air flow path P1 as illustrated in FIG. 26.

At the same time, air in the inner housing 200a flows along the second air flow path P2a.

More specifically, air at an outside of the inner housing 200a is introduced into the inner housing 200a through the lower opening of the inner housing 200a, and the air introduced into the inner housing 200a is moved via the stator inner section 210. Accordingly, the stator core 251, the stator coil 261, and the rotor 300 in contact with the air flowing along the stator inner section 210 are cooled.

Part (or some) of the air that has passed through the stator inner section 210 flows along the axial through section 220, and another part of the air flows along the bearing assembly cooling section 230.

This can result in facilitating cooling of the bearing assembly 350a.

In more detail, part of the air that has passed through the stator inner section 210 is brought into direct contact with the outer ring 354 of the second bearing 352 while passing through the second outer ring contact section 23012 to thereby cool the second bearing 352.

The air that has passed through the second outer ring contact section 23012 passes through the lower through portion 230211 of the spacer 353a and flows into the spacer 353a.

The air introduced into the spacer 353a moves along the axial direction, passes through the upper through portion 230212, and flows into the first outer ring contact section 23011. The air introduced into the first outer ring contact section 23011 is brought into direct contact with the outer ring 354 of the first bearing 351 to cool the first bearing 351, and is then discharged between the impeller 150 and the inner housing 200a.

The air discharged between the impeller 150 and the inner housing 200a flows into the cavity 1513, and a flow direction is changed while moving along an inner wall surface of the cavity 1513. Then the air flows outward in the radial direction of the impeller 150 and merges with air of the first air flow path P1.

The air joined together with the air of the first air flow path P1 flows along an outer surface of the inner housing 200a in the axial direction.

In the foregoing, exemplary implementations of the present disclosure have been shown and described. However, the present disclosure can be implemented in various forms without departing from the spirit or essential characteristics thereof, and accordingly, it is intended that the implementations described above are not be limited by the detailed description provided herein.

Moreover, even if any implementation is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

What is claimed is:

1. An electric motor assembly, comprising:
an outer housing;
an impeller disposed in the outer housing;
an inner housing disposed in the outer housing and spaced apart from the impeller, the inner housing being concentric with the outer housing;
a stator disposed in the inner housing; and
a rotor rotatably disposed in the stator, the rotor and the stator defining an air gap therebetween,
wherein the inner housing and the outer housing are spaced apart from each other to thereby define a first air flow path therebetween, the first air flow path being configured to carry air in an axial direction based on rotation of the impeller,
wherein the inner housing has a closed end portion and an open end portion, the closed end portion being located adjacent to the impeller in the axial direction,
wherein the impeller defines a cavity that has an annular shape extending in a circumferential direction, the cavity being recessed from a surface of the impeller facing the closed end portion of the inner housing in the axial direction,
wherein the inner housing and the impeller are configured to, based on rotation of the impeller, define an air pressure between the impeller and the closed end portion of the inner housing to be lower than atmospheric pressure,
wherein the inner housing defines a part of a second air flow path that extends through an inside of the inner housing, the second air flow path including (i) an axial through section extending in the axial direction through the inside of the inner housing, (ii) the cavity, and (iii) a gap defined between the impeller and the closed end portion of the inner housing, and
wherein the second air flow path is configured to, based on rotation of the impeller, guide air inside of the inner housing to the gap defined between the impeller and the closed end portion of the inner housing via the axial through section and the cavity by a pressure difference.

2. The electric motor assembly of claim 1, further comprising:
a rotating shaft coupled to the rotor; and
a bearing assembly disposed between the impeller and the rotor and configured to rotatably support the rotating shaft, and
wherein the inner housing defines a bearing assembly accommodating space that accommodates the bearing assembly.

3. The electric motor assembly of claim 2,
wherein at least a portion of the axial through section is disposed radially outside the bearing assembly.

4. The electric motor assembly of claim 3, wherein the stator comprises:
a stator core having a plurality of slots and a plurality of teeth; and
a stator coil that is wound around the stator core, and
wherein the second air flow path further comprises a stator inner section that passes through an inside of the stator core.

5. The electric motor assembly of claim 4, wherein the inner housing comprises a protruding section that protrudes relative to an end portion of the outer housing in the axial direction, and
wherein the protruding section defines a stator accommodating space that accommodates the stator.

6. The electric motor assembly of claim 5, wherein the axial through section faces one of the plurality of slots.

7. The electric motor assembly of claim 5, wherein the stator coil comprises a plurality of phase coils that are configured to be connected to a three-phase alternating (AC) power supply, and
wherein a cross-sectional area of the axial through section is less than a cross-sectional area of each of the plurality of phase coils.

8. The electric motor assembly of claim 7, wherein the cross-sectional area of the axial through section is 0.75 to 0.80 of the cross-sectional area of each of the plurality of phase coils.

9. The electric motor assembly of claim 5, further comprising an engaging part that is disposed between the inner housing and the stator and that engages the inner housing with the stator in the circumferential direction, the stator being configured to move relative to the inner housing in the axial direction.

10. The electric motor assembly of claim 9, wherein the engaging part comprises:
a coupling protrusion that protrudes from an inner surface of the inner housing in a radial direction and extends in the axial direction; and
a coupling recess that accommodates the coupling protrusion, the coupling recess being recessed from an outer surface of the stator in the radial direction and extending in the axial direction.

11. The electric motor assembly of claim 4, wherein the stator comprises an insulator that insulates the stator core and the stator coil from each other, the insulator being made by injection molding in a state in which the stator core is inserted into a mold.

12. The electric motor assembly of claim 3, wherein the second air flow path further comprises a bearing assembly cooling section defined around the bearing assembly accommodating space and configured to cool the bearing assembly.

13. The electric motor assembly of claim 12, wherein the bearing assembly cooling section is arranged offset from the axial through section in the circumferential direction.

14. The electric motor assembly of claim 12, wherein the bearing assembly comprises:
    a first bearing and a second bearing that are spaced apart from each other in the axial direction; and
    a spacer disposed between the first bearing and the second bearing,
    wherein each of the first bearing and the second bearing is a ball bearing comprising an outer ring, an inner ring, and a ball disposed between the outer ring and the inner ring, and
    wherein the bearing assembly cooling section radially extends from an inner surface of the bearing assembly accommodating space that faces the outer ring of each of the first bearing and the second bearing, the bearing assembly cooling section being configured to carry air in contact with the outer ring of each of the first bearing and the second bearing.

15. The electric motor assembly of claim 14, wherein the spacer defines a vent hole that enables communication of air therethrough.

16. The electric motor assembly of claim 1, further comprising a rotating shaft coupled to the rotor,
    wherein the impeller comprises a boss that faces the cavity and surrounds a circumference of the rotating shaft, and
    wherein the inner housing comprises a blocking rib that protrudes in the axial direction and extends in the circumferential direction, the blocking rib being inserted into the cavity between the boss and an inner surface of the inner housing.

17. The electric motor assembly of claim 3, wherein the axial through section is spaced apart from the bearing assembly accommodating space in a radial direction by a predetermined distance.

18. The electric motor assembly of claim 17, wherein the predetermined distance between the axial through section and the bearing assembly accommodating space is greater than or equal to 0.5 mm and less than or equal to 1.5 mm.

19. The electric motor assembly of claim 1, wherein an axial length of the inner housing is greater than an axial length of the outer housing, and
    wherein at least a portion of the second air flow path is disposed outside the outer housing in the axial direction.

20. The electric motor assembly of claim 1, wherein the gap is defined at a portion between the axial through section and the cavity and configured to discharge air from the axial through section and the cavity to the first air flow path, and
    wherein the first air flow path and the axial through section are configured to guide air in opposite directions from each other toward the gap defined between the impeller and the closed end portion of the inner housing.

* * * * *